United States Patent
Sekiya et al.

(10) Patent No.: US 9,819,018 B2
(45) Date of Patent: Nov. 14, 2017

(54) LITHIUM ION SECONDARY BATTERY

(71) Applicant: HITACHI MAXELL, LTD., Ibaraki-shi, Osaka (JP)

(72) Inventors: Tomohito Sekiya, Ibaraki (JP); Hiroshi Abe, Ibaraki (JP); Akira Inaba, Ibaraki (JP); Susumu Yoshikawa, Ibaraki (JP); Yuji Hashimoto, Ibaraki (JP); Seiji Ishizawa, Ibaraki (JP); Toshihiro Abe, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 15/168,804

(22) Filed: May 31, 2016

(65) Prior Publication Data
US 2016/0351900 A1    Dec. 1, 2016

(30) Foreign Application Priority Data

Jun. 1, 2015   (JP) ................................. 2015-111651

(51) Int. Cl.
| | |
|---|---|
| *H01M 4/36* | (2006.01) |
| *H01M 4/48* | (2010.01) |
| *H01M 10/0525* | (2010.01) |
| *H01M 10/0567* | (2010.01) |
| *H01M 10/0569* | (2010.01) |
| *H01M 4/131* | (2010.01) |
| *H01M 4/525* | (2010.01) |
| *H01M 4/134* | (2010.01) |
| H01M 4/02 | (2006.01) |

(52) U.S. Cl.
CPC ........... *H01M 4/483* (2013.01); *H01M 4/131* (2013.01); *H01M 4/134* (2013.01); *H01M 4/525* (2013.01); *H01M 10/0525* (2013.01); *H01M 10/0567* (2013.01); *H01M 10/0569* (2013.01); *H01M 4/366* (2013.01); *H01M 2004/021* (2013.01); *H01M 2004/027* (2013.01); *H01M 2004/028* (2013.01)

(58) Field of Classification Search
CPC ...... H01M 4/366; H01M 4/131; H01M 4/525; H01M 4/134; H01M 4/483; H01M 10/0567; H01M 10/0569; H01M 10/0525; H01M 2004/027; H01M 2004/028; H01M 2004/021
See application file for complete search history.

(56) References Cited

U.S. PATENT DOCUMENTS

| | | | | |
|---|---|---|---|---|
| 2008/0118847 A1* | 5/2008 | Jung | ................. | H01M 10/0567 429/342 |
| 2013/0089786 A1* | 4/2013 | Jeong | .................... | H01M 4/366 429/221 |
| 2016/0190566 A1* | 6/2016 | Shiozaki | ............... | H01M 4/366 429/231.1 |

FOREIGN PATENT DOCUMENTS

| | | |
|---|---|---|
| JP | 2004-47404 A | 2/2004 |
| JP | 2005-259697 A | 9/2005 |
| JP | 5302456 B1 | 10/2013 |
| WO | WO 2005/119820 | * 12/2005 |

\* cited by examiner

*Primary Examiner* — Laura Weiner
(74) *Attorney, Agent, or Firm* — Westerman, Hattori, Daniels & Adrian, LLP

(57) ABSTRACT

There is provided a lithium ion secondary battery with a high capacity and having excellent cycle characteristics. The lithium ion secondary battery, including a positive electrode, a negative electrode, a separator and a nonaqueous electrolyte liquid. Here, the positive electrode comprises a positive electrode material in which a surface of particles of a positive electrode active material is coated with an Al-containing oxide. The Al-containing oxide has an average coating thickness of 5 to 50 nm. The positive electrode active material contained in the positive electrode material comprises a lithium cobalt oxide comprising Co and at least one kind of an element $M^1$ selected from the group consisting of Mg, Zr, Ni, Mn, Ti and Al. The negative electrode comprises a material S including $SiO_x$ ($0.5 \leq x \leq 1.5$) as a negative electrode active material, wherein in 100 mass % of a total of the negative electrode active material included in the negative electrode, the materials S is included in the negative electrode active material at a content of 10 mass % or more.

6 Claims, 4 Drawing Sheets

LITHIUM ION SECONDARY BATTERY

TECHNICAL FIELD

The present invention relates to a lithium ion secondary battery with a high capacity and having excellent cycle characteristics.

TECHNICAL BACKGROUND

The lithium ion secondary battery, a kind of electrochemical elements, is being considered applicable to portable devices, automobiles, electric tools, electric chairs, and electricity storage systems both for family use and business use, in view of its characteristics of a high energy density. In particular, in portable devices, it is widely used as a power source of cell phones, smartphones or tablet type PCs.

As applicable apparatus of the lithium ion secondary battery being spread, it has been demanded to increase its capacity as well as to improve its batteries' properties in various aspects. In particular, as a secondary battery, its improvement of the charge discharge cycle characteristic is strongly demanded.

Usually, in a negative electrode active material of the lithium ion secondary battery, a carbon material such as graphite which is capable of insertion and desorption of lithium (Li) ions is widely used. On the other hand, Si or Sn or a material including such an element have been examined as a material capable of insertion and desorption of more amounts of lithium (Li) ions, and a compound $SiO_x$ having a structure that fine particles of Si are dispersed in $SiO_2$ is particularly focused on. Also, since these materials have a low conductivity, it has been proposed to make them into a structure in which the surface of the particles is coated with a conductive material such as carbon (Patent References No. 1 and No. 2).

In the conventional $SiO_x$ as disclosed in Patent References No. 1 and No. 2, a change in volume can be caused by the charge and the discharge, and therefore, the battery properties tend to show a remarkable drop as repeating charge discharge cycles. Then, another approach was proposed by making a negative electrode composition layer have a low density (1.4 g/cm$^3$ or less), and a negative electrode active material use an artificial graphite of 15 μm or more and 20 μm or less, a pitch coat graphite of 10 μm or less, and a carbon-coated SiO (1-10% by weight with respect to the whole weight of all the negative electrode active material), in order to improve the load characteristics and the cycle caused characteristic with respect to a large amount of electric currents of the battery (Patent Reference No. 3).

PRIOR ART REFERENCES

Patent References

Patent Reference No. 1: Japanese Laid-Open Patent Publication No. 2004-47404
Patent Reference No. 2: Japanese Laid-Open Patent Publication No. 2005-259697
Patent Reference No. 3: Japanese Patent No. 5302456

SUMMARY OF THE INVENTION

The Objectives to Solve by the Invention

In case of the structure disclosed by Patent Reference No. 3, it was found that that the capacity becomes higher than a battery using only graphite as a negative electrode active material. However, since the quantity of SiO is 10% by weight or less with respect to the whole weight of all the negative electrode active material, there are still objectives to make further improvements in making a high-capacity. Also, Patent Reference No. 3 only discloses a discharge capacity of the battery at the time of the 300th cycle, and fails to disclose how it has a capacity maintenance rate when repeating the charge discharge cycles. Therefore, it has not yet been found how the effects on the cycle characteristics have been improved.

The present invention was invented in view of the circumstances above, and provides a lithium ion secondary battery having a high-capacity and superior in the cycle characteristics.

Means to Solve the Objectives

According to the present application, there is provided a lithium ion secondary battery, including a positive electrode, a negative electrode, a separator and a nonaqueous electrolyte liquid, wherein the positive electrode comprises a positive electrode material in which a surface of particles of a positive electrode active material is coated with an Al-containing oxide, wherein the Al-containing oxide has an average coating thickness of 5 to 50 nm, wherein the positive electrode active material contained in the positive electrode material comprises a lithium cobalt oxide comprising Co and at least one kind of an element $M^1$ selected from the group consisting of Mg, Zr, Ni, Mn, Ti and Al, wherein the negative electrode comprises a material S including $SiO_x$ (0.5≤x≤1.5) as a negative electrode active material, wherein in 100 mass % of a total of the negative electrode active material included in the negative electrode, the materials S is included in the negative electrode active material at a content of 10 mass % or more.

Effects of the Invention

According to the present invention, it can be possible to provide a lithium ion secondary battery with a high capacity and having excellent cycle characteristics.

EMBODIMENTS TO CARRY OUT THE INVENTION

Figure 1:
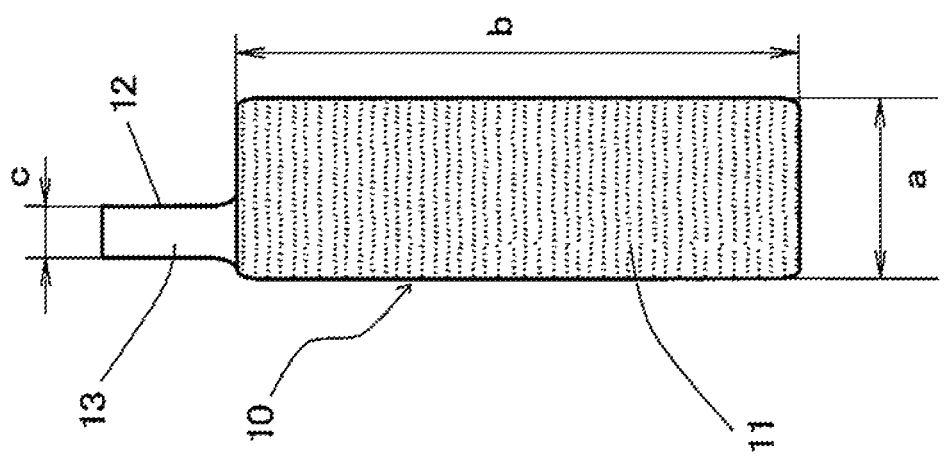
FIG. 1 is a plan view schematically showing an example of the positive electrode of the lithium ion secondary battery of the present invention.

It is characterized in that the materials S including the $SiO_x$ shows a capacity of 1000 mAh/g or more, remarkably exceeding a theoretical capacity of graphite, that is to be said as 372 mAh/g. In addition, comparing the Li insertion electrical potential at the time of charge in case of conventional graphite, it has been found that the materials S including the $SiO_x$ has a low Li insertion electric potential of the Li at the time of the charge.

By the way, generally speaking, in most instances, lithium ion secondary batteries are charged with a constant current constant voltage charge (CC-CV) method. In case of the constant current constant voltage charge, the charge of the lithium ion secondary battery is a method in which the charging starts at a constant current (i.e., CC charge) at the beginning, and then, when the battery reaches its charge upper limit voltage, the charge is continued in such a way to keep the constant voltage (i.e., CV charge). In the CV charge, the charge is carried out at a current value significantly lower than the current value at the CC charge. In the lithium ion secondary batteries of recent years, the charge upper limit voltage is often set up between 4.2V to 4.7V.

When the ratio of the materials S including $SiO_x$ in the negative electrode active material is set up at 10 mass % or more, the deposition of the Li could occur more easily at the time of charge, and therefore, the cycle characteristic of the lithium ion secondary batteries could have been deteriorated. It is considered that this happens due to the reason below. When a lithium ion secondary battery is subject to the CC-CV charges, the desorption of the Li ions from the positive electrode at the time of the CC mode charge can be progressed such that its battery voltage is raised. In the moment at the beginning stage of the charge, the Li ions can be inserted in the $SiO_x$ without any problems. However, when the CC mode charge is advanced and the battery voltage comes close to the charge upper limit voltage (the end stage of the CC mode), the electrical potential of the negative electrode comes close to 0V, and it accepts the Li ions while the deposition of Li can simultaneously occur. Thereby deposited Li does not contribute to play a role in the charge and the discharge thereafter. It is considered that this is why the cycle characteristics can be deteriorated.

Regarding the problems as mentioned above, the inventors of the present application have found the solutions. That it, by increasing the resistance of the positive electrode at the time of charge, the positive electrode electric potential can be raised at the CC mode and the battery voltage can be relatively raised. Therefore, the charge can be switched earlier into the CV mode than the end stage of the CC mode where the deposition of the Li is easily made on the negative electrode. Then, the charge electric current can be decremented so as to lower the polarization. As a result, it was found that the deposition of the Li can be restricted at the negative electrode.

The present invention can use a positive electrode material in which a lithium cobalt oxide is used as the positive electrode active material, and the surface thereof is provided with an Al-containing oxide to make the composition have a high resistance at the time of charge. As a result, the resistance of the positive electrode at the time of charge can be made higher, thereby make it difficult to bring about the Li deposition on the negative electrode. Thus, even if the ratio of the materials S including $SiO_x$ is increased, it is possible to provide a lithium ion secondary battery having an excellent charge discharge cycle characteristic.

In addition, the Al-containing oxide with which the surface of the particles of the positive electrode active material is coated can obstruct the lithium ions from inserting into or desorbing from the positive electrode active material. Therefore, for example, it might act to deteriorate the load characteristics of the battery. However, in the present invention, by specifying the average coating thickness of the Al-containing oxide into a specific value, the deterioration of the battery properties due to the coating of the Al-containing oxide can be restricted.

The lithium cobalt oxide in the positive electrode material acts as a positive electrode active material of the lithium ion secondary battery of the present invention. The lithium cobalt oxide can be expressed as a composition formula, $LiM^aO_2$, where $M^a$ inclusively refers to an element group including Co and the other elements that can be contained therein.

In the lithium cobalt oxide, the element $M^1$ can improve the stability at a high voltage region of the lithium cobalt oxide, and have an action to restrict the Co ions from elution while acting to improving the heat stability of the lithium cobalt oxide.

In the lithium cobalt oxide, in view of more effectively obtaining the actions above, the quantity of the element $M^1$ with respect to Co, that is, an atom ratio $M^1/Co$ can preferably satisfy 0.003 or more, and more preferably it can satisfy 0.008 or more.

However, when the quantity of the element $M^1$ in the lithium cobalt oxide is excessive, the quantity of Co can become too little, and it might become uncertain whether to secure the actions from it. Thus, regarding the quantity of the element $M^1$ with respect to Co in the lithium cobalt oxide, the atom ratio $M^1/Co$ can preferably satisfy 0.06 or less, and more preferably, it can satisfy 0.03 or less.

In the lithium cobalt oxide, Zr acts to adsorb the hydrogen fluoride that can be generated due to $LiPF_6$ included in the nonaqueous electrolyte liquid, thereby restricting the deterioration of the lithium cobalt oxide.

When a small amount of water is inevitably contaminated in the nonaqueous electrolyte liquid used in the lithium ion secondary battery, or when the other battery materials is at a state where water is adsorbed to, hydrogen fluoride can be generated in a reaction with $LiPF_6$ included in the nonaqueous electrolyte liquid. When hydrogen fluoride is generated inside the battery, its action can bring about the deterioration of the positive electrode active material.

However, when a lithium cobalt oxide including Zr is synthesized, a Zr oxide can be deposited on the surface of the particles, and the Zr oxide can adsorb the hydrogen fluoride. Therefore, the deterioration of the lithium cobalt oxide due to the generation of the hydrogen fluoride can be restricted.

In addition, the load characteristics of the battery can be improved when Zr is included in the positive electrode active material. It can be possible to use the lithium cobalt oxide included in the positive electrode material, which comprises two materials different in the average particle diameter from each other. Assume the one with a larger average particle diameter as a lithium cobalt oxide (A); and assume the other with a smaller average particle diameter as a lithium cobalt oxide (B). Generally speaking, use of a positive electrode active material having a large particle diameter tends to reduce the load characteristics of the battery. Therefore, in the positive electrode active material constituting the positive electrode material, it is preferable to include Zr in the lithium cobalt oxide (A) having such a larger average particle diameter. On the other hand, the lithium cobalt oxide (B) may or may not include Zr therein.

In the lithium cobalt oxide, in view of more favorably obtaining the actions above, the quantity of the element Zr with respect to Co, that is, an atom ratio Zr/Co can preferably satisfy 0.0002 or more, and more preferably it can satisfy 0.0003 or more. However, when the quantity of Zr in the lithium cobalt oxide is excessive, the quantity of the other elements can become too little, and it might become uncertain whether to secure the actions from them. Thus, regarding the quantity of the element Zr with respect to Co in the lithium cobalt oxide, the atom ratio Zr/Co can preferably satisfy 0.005 or less, and more preferably, it can satisfy 0.001 or less.

The lithium cobalt oxide can be prepared by mixing a Li-containing compound (e.g., lithium hydroxide, lithium carbonate), a Co-containing compound (e.g., cobalt oxide, cobalt sulfate), a Mg-containing compound (e.g., magnesium sulfate), a Zr-containing compound (e.g., zirconium oxide) and a compound containing an element $M^1$ (e.g., oxide, hydroxide, sulfate) to obtain a raw material mixture, followed by burning it to be synthesized. In addition, in order to synthesize a lithium cobalt oxide with a higher purity, it is preferable that a complex compound containing Co and the element $M^1$ (e.g., hydroxide, oxide) is mixed with a Li-containing compound and so on, to obtain a raw material mixture, followed by burning it.

The burning condition of the raw material mixture to synthesize the lithium cobalt oxide can be, for example, at 800 to 1050° C. for 1 to 24 hours. It is preferable that at a first stage, it is heated to a temperature that is lower than the burning temperature (e.g., 250 to 850° C.) and kept at the temperature to carry out a preliminary hearing, and then, it is raised to the burning temperature to make the reaction progress. The time to continue the preliminary heating is not particularly limited, but it can be generally caned out for a period of 0.5 to 30 hours. Also, the atmosphere of the burning can be an atmosphere including oxygen (namely, in the atmosphere), a mixed atmosphere of an inert gas (e.g., argon, helium, nitrogen) and an oxygen gas, or an oxygen gas atmosphere. In this case, it is preferable that the oxygen concentration is 15% or more (volume standard), and it is more preferable to be 18% or more.

The positive electrode of the present invention includes a material that stores and releases Li. This material is a positive electrode material in which the surface of the particles of the lithium cobalt oxide is coated with an Al-containing oxide (e.g., Al-containing oxide exists at 90 to 100% in all the area of the particle surface of the lithium cobalt oxide). The examples of the Al-containing oxide with which the surface of the particles of the lithium cobalt oxide is coated can include $Al_2O_3$, AlOOH, $LiAlO_2$, $LiCo_{1-w}Al_wO_2$ (here, $0.5<w<1$). One kind of these can be used alone, or two or more kinds can be used in combination. In addition, when the surface of the lithium cobalt oxide is coated with $Al_2O_3$ by means of the method described later, a coating film of $Al_2O_3$ can be formed from an Al-containing oxide containing not only Al but an element such as Co and Li which have moved from the lithium cobalt oxide. In the present invention, even such a coated film can be acceptable as the coating film of an Al-containing oxide and can cover the surface of the lithium cobalt oxide of the positive electrode material to constitute the positive electrode material.

The average coating thickness of the Al-containing oxide in the particles constituting the positive electrode material of the present invention can be set up in view of the aspects below: (i) to increase the resistance by the action of the Al-containing oxide that can obstruct the lithium ions from being inserted in or released from the positive electrode active material during the charge and the discharge of the battery including the positive electrode material; (ii) to thereby improve the charge discharge cycle characteristics of the battery by restricting the Li deposition at the negative electrode; and (iii) to favorably control the reaction of the positive electrode active material in the positive electrode material with the nonaqueous electrolyte liquid. In view of the above aspects, it is preferable 5 nm or more, and more preferably 15 nm or more. In addition, the average coating thickness of the Al-containing oxide can be also set in view of restricting the deterioration of the load characteristics of the battery by the action of the Al-containing oxide which can obstruct the lithium ions from being inserted into and released from the positive electrode active material in charging and discharging the battery. In view of the above, the average coating thickness of the Al-containing oxide in the particles constituting the positive electrode material of the present invention can be preferably 50 nm or less, and more preferably 35 nm or less.

In the specification of the present application, the feature that "the average coating thickness of the Al-containing oxide in the particles constituting the positive electrode material of the present invention" can be measured as follows. That is, a cross section of the positive electrode material obtained by the process of a convergence ion beam method is magnified 400,000 times by using a transmission electron microscope, to observe the positive electrode material particles within a field of vision of 500×500 nm. The same measurement is carried out at ten fields of vision that are arbitrarily selected. In each field of vision, ten particles of the positive electrode materials are arbitrarily selected, each having a cross section that is equal or less than the average particle diameter (d50)±5 μm, and a thickness of the coating film of the Al-containing oxide is measured. That is, the measurement is repeated for 100 particles. Then, the thickness of the coating film of the Al-containing oxide is obtained as an average (i.e., averaged number) of the values obtained by measured on the 100 particles.

The positive electrode material of the present invention has a specific surface area (specific surface area of the whole positive electrode material), which is preferably 0.1 $m^2/g$ or more, and more preferably, 0.2 $m^2/g$ or more. It is also preferably 0.4 $m^2/g$ or less, and more preferably, 0.3 $m^2/g$ or less. When the specific surface area of the positive electrode material satisfies the value as mentioned above, the resistance during the charge and the discharge of the battery can be increased so that the charge discharge cycle characteristics of the battery can be improved more favorable.

In addition, when the surface of the particles of the positive electrode active material constituting the positive electrode material is coated with an Al-containing oxide, or when it is constituted to make a Zr oxide deposition on the surface of the particles of the positive electrode active material, the surface of the positive electrode material can be usually made coarse, thereby increasing a specific surface area. Therefore, in addition to making the positive electrode material have a relatively large particle size, when a good property is given to the coating film of the Al-containing oxide with which the surface of the particles of the positive electrode active material is coated, the specific surface area being small as mentioned above can be obtained easily and it is considered preferable.

The lithium cobalt oxide included in the positive electrode material can be made of one kind, or two kinds of materials each having a different average particle diameter from each other as described above, or three or more kinds of materials each having a different average particle diameter from each other.

In order to adjust the positive electrode material to have the value of the specific surface area (i.e., specific surface area of the whole positive electrode material) as mentioned above, when it is made of one kind of lithium cobalt oxide, it is preferable that the positive electrode material has a average particle diameter of 10 to 35 μm.

When the lithium cobalt oxide included in the positive electrode material includes two materials different in the average particle diameter from each other, it is preferable to include at least a positive electrode material (a) and a positive electrode material (b). The positive electrode material (a) includes particles of the lithium cobalt oxide (A) coated with an Al-containing oxide and has an average particle diameter of 1 to 40 μm. The positive electrode material (b) includes particles of the lithium cobalt oxide (B) coated with an Al-containing oxide and has an average particle diameter is 1 to 40 μm, but the average particle diameter is smaller than that of the positive electrode material (a). Furthermore, it is preferable to be made of larger particles having an average particle diameter of 24 to 30 μm [positive electrode material (a)], and smaller particles having an average particle diameter of 4 to 8 μm [positive electrode material (b)]. When the positive electrode material includes the positive electrode material (a) and the positive electrode material (b), it is preferable that the ratio of the positive electrode material (a) in all the positive electrode material is 75 to 90 mass %. In this way, in addition to the adjustment of the specific surface area, the positive electrode material with the smaller particle diameter can enter into the gap of the positive electrode material with the larger particle diameter through the press work process of the positive electrode composition layer, such that the stress applied to the positive electrode composition layer can be wholly spread. As a result, the cracking of the particles of the positive electrode material can be favorably restricted and the action from the coating film of the Al-containing oxide can be given favorably.

The particle size distribution of the positive electrode material in the specification of the present application can be measured by using micro track particle size distribution measuring equipment "HRA9320" manufactured by Nikkiso Co., Ltd., to obtain an integral calculus volume of the particle size distribution from small particles. Also, the positive electrode material and the average particle diameter of the other particles in the specification of the present application can be measured by using the device as mentioned above, to obtain a value ($d_{50}$) of the 50% diameter in the multiplication fraction of the volume standard in case of obtaining the particle size distribution by integral calculus volume from the small particles.

In order to prepare a positive electrode material by coating the surface of the particles of the positive electrode active material such as lithium cobalt oxide with an Al-containing oxide, for example, the following method can be adopted. Into a lithium hydroxide aqueous solution at a pH of 9 to 11 and at a temperature of 60 to 80° C., particles of a positive electrode active material is put and dispersed by stirring, then, into which $Al(NO_3)_3 \cdot 9H_2O$ and an ammonium solution are dropped to suppress the pH from change, so as to produce $Al(OH)_3$ coprecipitation matter is produced, thereby adhering to the surface of the particles of the positive electrode active material. Then, the particles of the positive electrode active material in which $Al(OH)_3$ coprecipitation matter is adhered to are taken out from the reaction liquid, followed by washing, drying and applying a heat treatment to form a coating film of the Al-containing oxide on the surface of the particles of the positive electrode active material as a positive electrode material. It is preferable to carry out the heat treatment of the particles of the positive electrode active material in which $Al(OH)_3$ coprecipitation matter is adhered to in the atmosphere, at a heat treatment temperature of 200 to 800° C., and for a heat treatment duration of 5 to 15 hours. In case where the surface of the particles of the positive electrode active material is coated with the Al-containing oxide by the method above, adjustment of the heat treatment temperature as mentioned above can change the Al-containing oxide, i.e., the main component to constitute the coating film, into $Al_2O_3$, AlOOH, $LiAlO_2$, or $LiCo_{1-w}Al_wO_2$ (here, 0.5<w<1).

The positive electrode of the lithium ion secondary battery of the present invention has a structure in which for example, a positive electrode composition layer including a positive electrode active material (i.e., the positive electrode material as mentioned before), a conductive assistant and a binder is formed on one surface or both surfaces of a current collector. In addition, depending on the embodiment of a battery, a positive electrode composition including the positive electrode active material (i.e., the positive electrode material mentioned above), the conductive assistant and the binder can be molded into a pellet (a positive electrode composition pellet), which can be then used as a positive electrode.

The positive electrode material as mentioned above can be used alone as a positive electrode active material, but additional positive electrode active material can be used in combination with it. As such an additional positive electrode active material which can be used in combination with the positive electrode material as mentioned above, the examples can include ones (lithium-containing complex oxide capable of storing and releasing lithium ions), which have been conventionally used in nonaqueous secondary batteries such as lithium ion secondary batteries. In view of more improving the continuous charge properties of the battery without deteriorating the charge discharge cycle characteristics and the storage properties under a high temperature of the lithium ion secondary batteries based on the positive electrode material, it is preferable to use a lithium nickel oxide including Ni, Co and an element $M^2$ selected from the group consisting of Mg, Mn, Ba, W, Ti, Zr, Mo and Al.

When Ni, Co, the element $M^2$, and any additional optional elements which can be included are inclusively referred to as an element group $M^b$, the lithium nickel oxide can be expressed as a chemical formula $LiM^bO_2$. When each of the quantities of Ni, Co and the element $M^b$ in all the atoms, i.e., 100 mol %, of the element group $M^b$ is represented by s (mol %), t (mol %) and u (mol %), it is preferable to satisfy $30 \leq s \leq 97$, $0.5 \leq t \leq 40$, $0.5 \leq u \leq 40$. It is more preferable to satisfy $70 \leq s \leq 97$, $0.5 \leq t \leq 30$, $0.5 \leq u \leq 5$.

The lithium nickel oxide can be prepared by mixing a Li-containing compound (e.g., lithium hydroxide, lithium carbonate), a Ni-containing compound (e.g., nickel sulfate), a Co-containing compound (e.g., cobalt sulfate, cobalt oxide), and a compound containing an element $M^2$ (e.g., oxide, hydroxide, sulfate) to obtain a raw material mixture, followed by burning it to be synthesized. In addition, in order to synthesize a lithium nickel oxide with a higher purity, a complex compound (hydroxide, oxide) including several elements among Ni, Co and the element $M^2$, that is, an optional element if necessary, is mixed with another raw compound (e.g., Li-containing compound), to obtain a raw material mixture, followed by burning it to be synthesized.

In the same manner as the lithium cobalt oxide, the burning condition of the raw material mixture to synthesize the lithium nickel oxide can be, for example, at 800 to 1050° C. for 1 to 24 hours. It is preferable that at the first stage it is heated to a temperature that is lower than the burning temperature (e.g., 250 to 850° C.) and kept at the temperature to carry out a preliminary hearing, and then, it is raised to the burning temperature to progress the reaction. The time to continue the preliminary heating is not particularly limited, but it can be generally caned out for a period of 0.5 to 30 hours. Also, the atmosphere of the burning can be an atmosphere including oxygen (namely, in the atmosphere), a mixed atmosphere of an inert gas (e.g., argon, helium, nitrogen) and an oxygen gas, or an oxygen gas atmosphere. In this case, it is preferable that the oxygen concentration is 15% or more (volume standard), and it is more preferable to be 18% or more.

When the positive electrode of the lithium ion secondary battery of the present invention has a structure using the positive electrode material and additional positive electrode active material (e.g., lithium nickel oxide), it is preferable that the quantity of the positive electrode material is 50 mass % or more in the total, 100 mass % of the positive electrode material and said additional positive electrode active material. It is more preferably that it is 80 mass % or more (namely, it is preferable that the quantity of said additional positive electrode active material is 50 mass % or less in the total, 100 mass %, of the positive electrode material and said additional positive electrode active material; and it is more preferable that it is 20 mass % or less). In addition, as explained before, the lithium ion secondary battery of the present invention can be made by using the positive electrode material alone without using the positive electrode active material other than the positive electrode material. In this case, the favorable upper limit of the quantity of the positive electrode material in the total, 100 mass % of the positive electrode material and said additional positive electrode active material can be 100 mass %. However, in order to favorably secure the improvement effects on the continuous charge properties of the battery by using the lithium nickel oxide as mentioned before, it is preferable that the quantity of the lithium nickel oxide can be 5 mass % or more in the total, 100 mass % of the positive electrode material and the lithium nickel oxide. It is more preferable that it is 10 mass % or more.

The examples of the conductive assistant used in the positive electrode of the lithium ion secondary battery of the present invention can include carbon material including graphites (graphite state carbon material) such as natural graphite (e.g., scale-like graphite) and artificial graphite; carbon black such as acetylene black, ketjen black, channel black, furnace black, lamp black, and thermal black; and carbon fibers. The examples of the binder used in the positive electrode of the lithium ion secondary battery of the present invention can favorably include polyvinylidene fluoride (PVDF), polytetrafluoroethylene (PTFE), styrene-butadiene rubber (SBR), and carboxymetyl-cellulose (CMC).

The positive electrode, for example, can be prepared as follows. The positive electrode material, a conductive assistant, a binder and etc. are dispersed in a solvent such as N-methyl-2-pyrrolidone (NMP) to prepare a composition containing a positive electrode composition in a paste or slurry state (here, the binder may be dissolved in the solvent), which is then applied on one surface or both surfaces of a current collector, and dried, and then, a calendar process is applied if necessary.

It is noted that the manufacturing method of the positive electrode is not limited thereto, and other methods can be used. For example, in case where the positive electrode is prepared as a pellet form of a positive electrode composition molded body, a positive electrode composition including the positive electrode material, a conductive assistant, a binder and etc. is subject to a press work process to make it into a pellet form, thereby preparing a positive electrode.

As the current collector, the ones similar to those which have been conventionally used in the positive electrode of the lithium ion secondary batteries can be used. The examples can include an aluminum foil, punched metal, mesh, expanded metal, and the thickness is preferably 5 to 30 µm.

The material S including $SiO_x$ is known to have a large irreversible capacity. In order to suppress the drop of the initial charge discharge efficiency caused by the feature above, a method to introduce Li into the negative electrode composition layer in advance is known. When adopting a method to introduce Li into the negative electrode composition layer by contacting a Li source, the negative electrode current collector as mentioned above can be formed from a metal foil having formed several through holes, each penetrating from one surface thereof to the other surface thereof, and the positive electrode current collector can be also formed from a metal foil having formed several through holes, each penetrating from one surface thereof to the other surface thereof. Accordingly, Li can move into the whole of the battery inside through the through-holes of the negative electrode current collector and the positive electrode current collector. It is, therefore, unnecessary to make the whole of the negative electrode come in contact with the Li source, thereby improving the work efficiency.

In case where the positive electrode current collector is formed from a metal foil having formed several through holes, each penetrating from one surface thereof to the other surface thereof, it is preferable that the upper limit of the thickness is 30 µm. It is desirable that the lower limit is 4 µm in view of securing a mechanical strength. It is preferable that the size of the through hole is 0.05 mm or more to make the Li move homogeneously. However, when the size of the through hole is too large, the mechanical strength cannot be maintained, and therefore, it is preferably 1 mm or less. Furthermore, it is desirable that the pitch between the through holes is around 1 to 5 mm.

In the composition of the positive electrode composition layer or the positive electrode composition molded body, it is favorable that the quantity of the positive electrode active material (including the positive electrode material mentioned before) is 60 to 95 mass %, that the quantity of the binder is 1 to 15 mass %, and that the quantity of the conductive assistant is 3 to 20 mass %. In addition, in case where an embodiment of a positive electrode including a positive electrode composition layer and a current collector is adopted, it is preferable that the thickness (a thickness per one side of the current collector) of the positive electrode composition layer is 30 to 150 µm. Furthermore, in the case where a positive electrode is constituted from a positive electrode composition molded body, it is preferable that the thickness is 0.15 to 1 mm.

The negative electrode of the lithium ion secondary battery of the present invention has a structure in which, for example, a negative electrode composition layer including a negative electrode active material and a binder is formed on one surface or both surfaces of a current collector.

The negative electrode of the present invention can include a material S including $SiO_x$ (here, $0.5 \leq x \leq 1.5$) as a negative electrode active material. In 100 mass % of a total of the negative electrode active material included in the negative electrode, the materials S is included in the negative electrode active material at a content of 10 mass % or more, in view of attaining a high capacity.

The $SiO_x$ can include microcrystals or an amorphous phase of Si. In this case, the atomic ratio of Si and O is determined with including the microcrystals or the amorphous phase of Si. In other words, the $SiO_x$ can be provided in a structure in which Si (e.g., microcrystalline Si) is dispersed in an amorphous $SiO_2$ matrix, where the atomic ratio x can be determined by including the amorphous $SiO_2$ and the Si dispersed in the amorphous $SiO_2$, satisfying $0.5 \leq x \leq 1.5$. For example, when the material is provided as having a structure in which Si is dispersed in an amorphous $SiO_2$ matrix, and the molar ratio of $SiO_2$ and Si is 1:1, the structural formula of this material can be represented by SiO because x=1 is established. In the case of the material having such a structure, a peak due to the presence of Si (microcrystalline Si) might not be observed, e.g., by X-ray diffraction analysis, but the presence of fine Si can be confirmed by transmission electron microscope observation.

Also, it is favorable that $SiO_x$ is a complex with a carbon material, and for example, it is desirable that the surface of $SiO_x$ is coated with a carbon material. Usually, $SiO_x$ has a poor conductivity. Therefore, if this is used as a negative electrode active material, in view of securing good battery properties, a conductive material (i.e., conductive assistant) is used, such that the mixing and dispersing of the $SiO_x$ and the conductive material in the negative electrode are made better, thereby forming a superior conductive network. By using such a complex of $SiO_x$ and carbon material, a better conductive network can be formed in the negative electrode rather than using a material obtained by merely mixing $SiO_x$ with carbon material.

The specific resistance value of the $SiO_x$ is generally $10^3$ to $10^7$ kΩcm, whereas the specific resistance value of the carbon material as described above is generally $10^5$ to 10 kΩcm. The conductivity of the material S can be improved by complexing the $SiO_x$ and the carbon material.

The composite of the $SiO_x$ and the carbon material can be, e.g., a granular material of the $SiO_x$ and the carbon material, in addition to the above composite obtained by coating the surface of the $SiO_x$ with the carbon material.

Preferred examples of the carbon material that can be used with the $SiO_x$ to form the composite include a low crystalline carbon, carbon nanotube, and a vapor grown carbon fiber.

Specifically, it is preferable that the carbon material is at least one selected from the group consisting of a fibrous or coil-shaped carbon material, carbon black (including acetylene black and Ketjen Black), artificial graphite, an easily-graphitizable carbon, and a hardly-graphitizable carbon. The fibrous or coil-shaped carbon material is preferred because it has a large surface area and allows the conductive network to be easily formed. The carbon black (including acetylene black and Ketjen. Black), the easily-graphitizable carbon, and the hardly-graphitizable carbon are preferred because they have high electrical conductivity and high liquid-retaining property, and also are likely to remain in contact with $SiO_x$ particles even if the $SiO_x$ particles expand and contract.

Among the above carbon materials, it is particularly preferable to use the fibrous carbon material when the composite of the $SiO_x$ and the carbon material is a granular material. This is because the fibrous carbon material is in the form of a fine thread and highly flexible, and thus can follow the expansion and contraction of the $SiO_x$ during charge and discharge of the battery. Moreover, the fibrous carbon material has a high bulk density, and thus can have many contact points with the $SiO_x$ particles. The examples of the fibrous carbon include a polyacrylonitrile (PAN) carbon fiber, a pitch carbon fiber, a vapor grown carbon fiber, and carbon nanotube. Any of them can be used.

When the composite of the $SiO_x$ and the carbon material is used as the negative electrode, the ratio of the $SiO_x$ and the carbon material is determined so that the carbon material is preferably 5 parts by weight or more, and more preferably 10 parts by weight or more with respect to 100 parts by weight of the $SiO_x$ to produce a good effect of the combination of the $SiO_x$ and the carbon material. In the composite, if the ratio of the carbon material that is to be combined with the $SiO_x$ is too large, the amount of the $SiO_x$ in the negative electrode mixture layer is reduced, which in turn might reduce the effect of increasing the capacity. Therefore, the carbon material is preferably 50 parts by weight or less, and more preferably 40 parts by weight or less with respect to 100 parts by weight of the $SiO_x$.

The composite of the $SiO_x$ and the carbon material can be obtained, e.g., in the following manner.

When the composite is formed by coating the surface of the $SiO_x$ with the carbon material, e.g., the $SiO_x$ particles and a hydrocarbon gas are heated in a gas phase, and the carbon produced by thermal decomposition of the hydrocarbon gas is deposited on the surfaces of the particles. Such a chemical vapor deposition (CVD) method allows the hydrocarbon gas to spread over the $SiO_x$ particles, so that a thin uniform film (carbon material coating layer) including the carbon material with conductivity can be formed on the surfaces of the particles. Thus, it is possible to make the $SiO_x$ particles uniformly conductive with a small amount of the carbon material.

In the production of the $SiO_x$ coated with the carbon material, the treatment temperature (ambient temperature) of the CVD method varies depending on the type of the hydrocarbon gas, and is generally 600 to 1200° C. In particular, the treatment temperature is preferably 700° C. or higher, and more preferably 800° C. or higher. This is because the residual impurities can be reduced at a higher treatment temperature and a coating layer including a highly conductive carbon can be formed.

As a liquid source of the hydrocarbon gas, toluene, benzene, xylene, mesitylene, or the like can be used. For ease of handling, toluene is particularly preferred. The hydrocarbon gas can be obtained by evaporating the liquid source (e.g., by bubbling with a nitrogen gas). Moreover, a methane gas or acetylene gas also can be used.

When the granular material of the $SiO_x$ and the carbon material is produced, a dispersion in which the $SiO_x$ is dispersed in a dispersion medium is prepared and then sprayed and dried to produce a granular material including a plurality of particles. The dispersion medium can be, e.g., ethanol. It is appropriate that the dispersion is generally sprayed in an atmosphere at 50 to 300° C.

Other than the above method, the granular material of the $SiO_x$ and the carbon material can be also produced by a mechanical granulation method using a vibrating or planetary ball mill, a rod mill, or the like.

When the average particle diameter of the materials S is too small, the dispersibility of the materials S decreases so that sufficient effects of the present invention might not be obtained. Also, the materials S has a large volumetric change by the charge and the discharge of the battery, and therefore, when an average particle diameter is too large, the materials S tend to be collapsed due to the expansion and the shrinkage (this phenomenon leads to a capacity deterioration of the materials S). Therefore, it is preferably 0.1 μm or more and 10 μm or less.

In view of attaining a high capacity of the lithium ion secondary battery, the content of the materials S in all the negative electrode active material in the negative electrode composition layer can be preferably 10% or more, and more preferably 20 mass % or more, and further preferably 50 mass % or more.

In the negative electrode active material, the materials S alone can be used (in other words, the content of the materials S in the negative electrode active material is 100 mass %), but another negative electrode active material can be used in combination with it.

As said additional negative electrode active material which can be used together with the materials S, the examples thereof can include carbon materials such as graphite, thermolysis carbons, cokes, glassy carbons, sintered materials from an organic polymer compound, mesocarbon microbeadses, carbon fibers, and activated carbons; lithium or a lithium alloy; a single element of Si or Sn; an alloy including Si or Sn; and an oxide including Si or Sn (except for ones corresponding to the materials S). These additional negative electrode active materials can be used unless otherwise obstructing the effects of the present invention.

The binder of the negative electrode composition layer can be selected in such a way that, for example, it is electrochemically inert to Li within the electrical potential range of the negative electrode and that it does not influence on the other components as much as possible. In details, the examples can suitably include styrene-butadiene rubber (SBR), polyvinylidene fluoride (PVDF), carboxymethylcellulose (CMC), polyvinyl alcohol (PVA), methylcellulose, polyimide, polyamideimide, polyacrylic acid, and the derivatives thereof and the copolymers thereof. These binders can be used alone, or two or more kinds thereof can be used in combination.

The negative electrode composition layer as mentioned above can further include a conductive material as a conductive assistant. Such a conductive material is not particularly limited so long as it does not cause a chemical reaction inside the battery. The examples can include carbon black (e.g., thermal black, furnace black, channel black, ketjen black, acetylene black), carbon fibers, metal powders (e.g., powders of e.g., copper, nickel, aluminum, silver and etc.), metal fibers, polyphenylene derivatives (ones disclosed in Japanese Laid-Open Patent Publication No. S59-20971). These compounds can be used alone or in combination of two or more kinds. Of these examples, it is preferable to use carbon black, and ketjen black and acetylene black are more preferable.

For example, the negative electrode can be prepared as follows: A negative electrode active material and a binder, as well as a conductive assistant if necessary, are dispersed into a solvent such as NMP or water to prepare a composition containing a negative electrode composition (here, the binder may be dissolved in the solvent), which is then applied to one surface or both surface of a current collector. After drying, a calendar process is applied if necessary, so as to prepare a negative electrode. However, the method to prepare a negative electrode is not limited thereto, and another method can be adopted to prepare it.

It is favorable that the thickness of the negative electrode composition layer is 10 to 100 μm per one side of the current collector. Also, the density of the negative electrode composition layer (which can be calculated from a thickness, and a mass of the negative electrode composition layer per a unit area laminated on the current collector) is preferably 1.0 g/cm$^3$ or more for the purpose to attain a high capacity of a battery. It is more preferably 1.2 g/cm$^3$ or more. Furthermore, since adverse effects such as a drop of osmosis of the nonaqueous electrolyte liquid can be found when the density of the negative electrode composition layer is too high, it is preferably 1.6 g/cm$^3$ or less. Regarding the composition of the negative electrode composition layer, for example, it is preferable that the quantity of the negative electrode active material is 80 to 99 mass %; it is preferable that the quantity of the binder is 0.5 to 10 mass %; and it is preferable that the quantity conductive assistant, if used, is 1 to 10 mass %.

As a support (i.e., current collector) to collect electric current of the negative electrode and hold the negative electrode composition layer, a foil, punched metal, mesh or expanded metal, made of copper or nickel can be used. When this negative electrode support is configured to reduce the thickness of the whole negative electrode in order to obtain a battery of a high energy density, it is preferable that the upper limit of the thickness is 30 μm. It is desirable that the lower limit is 4 μm in view of securing a mechanical strength.

Comparing the charge discharge efficiency (more than 90%) of conventional graphite, there are many instances in case of SiO$_x$ in which the initial charge discharge efficiency does not reach 80%, and to that extent, an irreversible capacity can be increased. When the materials S are included at a content of 10 mass % or more in all the negative electrode active material, it was found that there can be brought about a phenomenon where the Li ions released from the positive electrode move to the side of the negative electrode at the time of the initial charge, and then, in the discharge, the Li ions that are able to return to the side of the positive electrode can be significantly reduced. Therefore, in order to further improve the battery capacity, it is preferable to introduce a Li source into the negative electrode in advance.

The method to introduce Li into the negative electrode active material above can be described as follow. For example, a negative electrode is housed in a battery case in a condition that the negative electrode composition layer contacts a Li source by e.g., a metal Li foil attaching to the negative electrode composition layer, followed by injecting a nonaqueous electrolyte liquid into the battery case. As a result, Li can be introduced into the negative electrode composition layer. When this method is adopted, if a metal foil is used as a support such that the negative electrode composition layer is formed on both surfaces of the metal foil, it will be necessary to place the Li sources on the negative electrode composition layers having formed on both surfaces thereof. On the other hand, when a metal foil having formed several through holes, each penetrating from one surface thereof to the other surface thereof, is used as a support (i.e., current collector), the negative electrode composition layers on both surfaces of the support is electrically connected through the through hole. Therefore, if a Li source is provided on one of the planes, Li ions can move from one negative electrode composition layer to the other negative electrode composition layer through the through hole. As a result, Li can be introduced into the negative electrode composition layer in both surfaces, thereby simplifying the handling to place the Li source.

In case where the negative electrode support (i.e., current collector) is formed from a metal foil having formed several through holes, each penetrating from one surface thereof to the other surface thereof, it is preferable that the upper limit of the thickness is 30 μm. It is desirable that the lower limit is 4 μm in view of securing a mechanical strength. It is preferable that the size of the through hole is 0.05 mm or more to homogeneously introduce Li therein. However, when the size of the through hole is too large, the mechanical strength cannot be maintained, and therefore, it is desirably 1 mm or less. Furthermore, it is desirable that the pitch between the through holes is around 1 to 5 mm.

The methods to introduce Li into the negative electrode composition layer are further described. Other than attaching a Li foil to the negative electrode composition layer as described above, the negative electrode composition layer can contain Li particles, or Li can be vapored onto the surface of the negative electrode, or other know methods can be adopted to make the negative electrode come in contact with a Li source, before housing the negative electrode into a battery case, followed by injecting a nonaqueous electrolyte liquid into a battery case and applying a charge discharge process. In addition, there can be another method in which a nonaqueous electrolyte liquid is filled in the battery case where a negative electrode and a Li source are provided without contacting with each other, and then, a charge discharge process is applied through an outside connection.

A separator used in the lithium ion secondary battery of the present invention is preferably a porous film made of, for example, polyolefin such as polyethylene (i.e., PE), polypropylene, or ethylene-propylene copolymer; or polyester such as polyethylene terephthalate or copolymerized polyester. It is preferable that the separator has a property of being able to close its pores (i.e., shutdown function) at 100 to 140° C. For this reason, the separator preferably includes a thermoplastic resin having a melting temperature of 100 to 140° C. as its component. In this case, the melting temperature is measured with a differential scanning calorimeter (DSC) in accordance with Japanese Industrial Standards (JIS) K 7121. The separator is preferably a single-layer porous film made of polyethylene as a main component, or a laminated porous film of two to five layers of polyethylene and polypropylene. When mixing polyethylene with a resin having a higher melting point than polyethylene such as polypropylene, or laminating the two resins, polyethylene is desirably included at 30 mass % or more, and more desirably at 50 mass % or more, in the resins making up the porous film.

For such a resin porous film, for example, a porous film made of any of the thermoplastic resins mentioned above and used in conventionally-known lithium ion secondary batteries and the like, i.e., an ion-permeable porous film produced by solvent extraction, dry drawing, wet drawing, or the like can be used.

The average pore diameter of the separator is preferably 0.01 μm or more, and more preferably 0.05 μm or more, and is preferably 1 μm or less, and more preferably 0.5 μm or less.

Characteristically, the separator desirably has a Gurley value of 10 to 500 sec. The Gurley value is obtained by a method according to JIS P 8117 and expressed as the length of time (seconds) it takes for 100 ml air to pass through a membrane at a pressure of 0.879 g/mm$^2$. If the air permeability is too large, the ion permeability may deteriorate. On the other hand, if the air permeability is too small, the strength of the separator may decline. Furthermore, it is desirable that the separator has strength of 50 g or more, the strength being piercing strength obtained using a needle having a diameter of 1 mm. When lithium dendrite crystals develop, the dendrite crystals may penetrate the separator and cause a short circuit if the piercing strength is too small.

The separator used can be a laminate type separator having a porous layer (I) mainly composed of a thermoplastic resin, and a porous layer (II) mainly composed of fillers having a heat resistant temperature of 150° C. or more. The separator above has a shut-down property, a heat resistance (heat resistant shrinkage) and a high mechanical strength. In addition, it was found that the cycle characteristics can be further improved by using such a laminate type separator. The reasons are not found, but it is presumed that since the separator has a high mechanical strength to provide with a high resistance against the expansion or shrinkage of the negative electrode caused by the charge discharge cycle, the separator can be restricted from twisted and can maintain the coherency among the negative electrode, the separator and the positive electrode.

In the specification of the present application, the feature of "heat-resistant temperature of 150° C. or more" means that it does not start transformation such as softening at least at a temperature of 150° C.

The porous layer (I) included in the laminated type separator is a layer provided mainly to ensure the shutdown function, and thus, if the battery reaches the melting point of the resin that is a main component of the porous layer (I), the resin contained in the porous layer (I) melts and closes the pores of the separator, causing a shutdown that suppresses the progress of the electrochemical reaction.

The resin having a melting point of 140° C. or less used as a main component of the porous layer (I) can be, for example, PE. The form of the porous layer (I) can be one obtained by applying a dispersion containing PE particles on a substrate such as a microporous film or a non-woven fabric which is usually used in the lithium secondary batteries, followed by drying the substrate. In the total of the constituent components of the porous layer (I) (here, it is the total volume excluding the cavity portions; and the same applies to the content ratios by volume of the components of the porous layer (I) and the porous layer (II)), it is preferable that the content ratio by volume of the main resin having a melting point of 140.degree. C. or less is 50 vol % or more, and more preferably 70 vol % or more. In the case of forming the porous layer (I) using a PE microporous film described above, the volume of the resin having a melting point of 140° C. or less is 100 vol %.

The porous layer (II) included in the laminated type separator has a function that prevents short-circuiting caused by direct contact between the positive electrode and the negative electrode, even if the internal temperature of the battery rises high. The function is ensured by the inorganic filler having a heat resistance temperature of 150° C. or more. In other words, when the battery temperature rises high, even if the porous layer (I) shrinks, the porous layer (II) that is less susceptible to shrinkage can prevent short-circuiting caused by direct contact between the positive and negative electrodes that can occur as a result of thermal shrinkage of the separator. Also, the heat resistant porous layer (II) acts as a framework for the separator, and therefore thermal shrinkage of the porous layer (I), or in other words, the overall thermal shrinkage of the separator can be suppressed as well.

The fillers of the porous layer (II) can be either of organic particles or inorganic particles, so long as they have a heat resistant temperature of 150° C. or more, and are stable in the electrolyte liquid included in the battery, and furthermore, are electrochemically stable and hard to cause a redox reaction within the range of the battery operation voltage. They are preferably fine particles in view of dispersibility. In addition, inorganic oxide particles, and more specifically, alumina, silica or boehmite are preferable. Alumina, silica, or boehmite has a high oxidation resistance, and are capable of adjust their particle size, shape into a desired numerical value. As a result, the cavity rate of the porous layer (II) can be precisely controlled. The fillers having a heat resistant temperature of 150° C. or more can be used alone or in combination of two or more kinds.

The nonaqueous electrolyte liquid used in the lithium ion secondary battery of the present invention can be a solution dissolving a lithium salt in an organic solvent.

The organic solvent used for the non-aqueous electrolytic solution is not particularly limited as long as it dissolves the lithium salt and does not cause a side reaction such as decomposition in the working voltage range of the battery. Examples of the organic solvent include the following: cyclic carbonates such as ethylene carbonate, propylene carbonate, and butylene carbonate; chain carbonates such as dimethyl carbonate, diethyl carbonate, and methyl ethyl carbonate; chain esters such as methyl propionate; cyclic esters such as .gamma.-butyrolactone; chain ethers such as dimethoxyethane, diethyl ether, 1,3-dioxolane, diglyme, triglyme, and tetraglyme; cyclic ethers such as tetrahydrofuran, and 2-methyltetrahydrofuran; and sulfurous esters such as ethylene glycol sulfite. The organic solvent may be a mixture of two or more of these materials. A combination of the materials capable of achieving a high conductivity, e.g., a mixed solvent of the ethylene carbonate and the chain carbonate is preferred for better characteristics of the battery.

The lithium salt used for the non-aqueous electrolytic solution is not particularly limited as long as it dissociates in the solvent to produce a lithium ion and is not likely to cause a side reaction such as decomposition in the working voltage range of the battery. Examples of the lithium salt include inorganic lithium salts such as $LiClO_4$, $LiPF_6$, $LiBF_4$, $LiAsF_6$, and $LiSbF_6$, and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$), and $LiN(RfOSO_2)_2$ (where Rf represents a fluoroalkyl group).

The concentration of the lithium salt in the non-aqueous electrolytic solution is preferably 0.5 to 1.5 mol/L, and more preferably 0.9 to 1.25 mol/L.

It is preferable to contain a nitrile type additive and 1,3-dioxane into the nonaqueous electrolyte liquid. As a result, the charge discharge cycle characteristics of the battery can be further improved.

The examples of the nitrile type additive can include mononitriles such as acetonitrile, propionitrile, butyronitrile, valeronitrile, benzonitrile and acrylonitrile; dinitriles such as malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-methylglutaronitrile; cyclic nitriles such as benzonitrile; and alkoxy substituted nitriles such as methoxyacetonitrile. One kind of these can be used alone, or two or more kinds thereof can be used in combination. Of these examples, dinitriles are more preferable.

The content of the nitrile type additive in the nonaqueous electrolyte liquid used in the battery can be determined in view of favorably securing the effect by using it. Therefore, it can be preferably 0.1 mass % or more, and more preferably, 0.3 mass % or more. However, when the content of the nitrile type additive in the nonaqueous electrolyte liquid is too high, the quantity of gas generation inside the battery can increase, and on the contrary, the effect to suppress the swollenness might be reduced. Therefore, the content of the nitrile type additive in the nonaqueous electrolyte liquid used in the battery is preferably 7 mass % or less, and more preferably, 3 mass % or less.

The content of 1,3-dioxane in the nonaqueous electrolyte liquid used in the battery can be determined in view of favorably securing the effect by using it. Therefore, it can be preferably 0.1 mass % or more, and more preferably, 0.3 mass % or more. However, when the quantity of 1,3-dioxane in the nonaqueous electrolyte liquid is too high, the effect to improve the load characteristic of the battery and the effect to improve the charge discharge cycle characteristic might be deteriorated. Therefore, the content of 1,3-dioxane in the nonaqueous electrolyte liquid used in a battery can be preferably 5 mass % or less, and more preferably, 3 mass % or less.

In addition, the nonaqueous electrolyte liquid can further contain additives in view of further improvement of the charge discharge cycle characteristics or for the purpose to improve the safety features such as high temperature storage property and overcharge prevention property. The examples of the additives that can be appropriately added can include vinylene carbonate, vinylethylene carbonate, anhydrous acid, sulfonate, 1,3-propanesultone, diphenyl disulfide, cyclohexylbenzene, biphenyl, fluorobenzene, t-butylbenzene, and phosphonoacetate compounds (including the derivatives thereof).

Furthermore, known gelatification agents such as a polymer can be added into the nonaqueous electrolyte liquid to make it in a gel state (i.e., gelled electrolyte).

The form of the lithium ion secondary battery of the present invention is not particularly limited. For example, it can be provided in any form of a coin, a button, a sheet, a laminate, a cylindrical shape, a flat shape, a prism shape, and a large size embodiment to use it in electric vehicles.

In case of the lithium ion secondary battery of the present invention, at the time when it is discharged at an discharge current rate of 0.1 C to reach a voltage of 2.0V, a molar ratio (Li/M) of Li and a metal M except for Li is 0.9 to 1.05, wherein said Li and said metal M are contained in the positive electrode material and the positive electrode active material in the positive electrode, As described before, in case where a negative electrode active material such as $SiO_x$ having a high irreversible capacity is used in the negative electrode, there can be found a phenomenon that the Li ions released from the positive electrode move to the side of the negative electrode during the charge, and then, in the discharge, the Li ions that are able to return to the side of the positive electrode are significantly reduced. Therefore, in accordance with the previous description that Li is introduced into the negative electrode in advance, the capacity of the positive electrode can be completely used during the discharge of the battery, thereby increasing the capacity of the battery. That the (Li/M) as mentioned above is 0.9 to 1.05 can be accomplished by introducing Li into the negative electrode composition layer including the materials S as mentioned above by means of various methods as described before.

The composition analysis of the positive electrode material at the time when it is discharged to reach the voltage of 2.0V at a discharge current rate of 0.1 C can be carried out by means of ICP (Inductive Coupled Plasma) method as follow. First, 0.2 g of a positive electrode material as a measurement target is taken out and put into a 100 mL container. Then, 5 mL of pure water, 2 mL of aqua regia, and 10 mL of pure water are sequentially added in the order, thereby bringing about heat solution, followed by cooling and diluting 25 times with pure water. An ICP analyzer, "ICP-757" manufactured by JARRELASH Co., Ltd. is used to carry out a composition analysis by a calibration curve method. The quantities of composition can be identified from the results as obtained.

An example of the Li/M is explained with reference to Example 1 as described later. Example 1 uses a positive electrode material (a1) having formed a coating film of an Al-containing oxide on the surface of $LiCo_{0.9795}Mg_{0.011}Zr_{0.0005}Al_{0.009}O_2$, that is, a lithium cobalt oxide (A1), and a positive electrode material (b1) having formed a coating film of an Al-containing oxide on the surface of $LiCo_{0.97}Mg_{0.012}Al_{0.009}O_2$, that is, a lithium cobalt oxide (B1). In this case, the metal M other than Li refers to Co, Mg, Zr, and Al. In other words, after preparing a lithium ion secondary battery and after subjecting to predetermined charge discharge processes, the battery is disassembled to take the positive electrode material (that is, a mixture in Example 1) from the positive electrode composition layer, which is analyzed to obtain the Li/M.

The lithium ion secondary battery of the present invention can be used in a condition of an upper limit voltage of about 4.2V like conventional lithium ion secondary batteries. However, it is possible to use it while setting up its upper limit voltage in the charge at a voltage more than that, i.e., 4.4V or more. As a result, a high capacity can be accomplished and even when repeatedly using it for a long term, superior characteristics can be maintained stably. In addition, it is preferable that the upper limit voltage of the charge of the lithium ion secondary battery is 4.5V or less.

The lithium ion secondary battery of the present invention can be used as the same applications as those of conventionally known lithium ion secondary batteries.

EXAMPLES

Hereinafter, the present invention is described in more detail based on the examples. It is, however, noted that the following examples should not be used to narrowly construe the scope of the present invention.

Example 1

<Preparation of the Positive Electrode>

$Li_2CO_3$ as a Li-containing compound, $Co_3O_4$ as a Co-containing compound, $Mg(OH)_2$ as a Mg-containing compound, $ZrO_2$ as a Zr-containing compound, and $Al(OH)_3$ as an Al-containing compound were put into a mortar at an appropriate mixture ratio, and mixed and hardened into a pellet form. Using a muffle furnace, it was burned at 950° C. in the atmosphere (in the atmospheric pressure) for 24 hours. Thereby obtained was a lithium cobalt oxide (A1) whose composition formula was found to be $LiCo_{0.9795}Mg_{0.011}Zr_{0.0005}Al_{0.009}O_2$ by means of the ICP method.

Then, into 200 g of a lithium hydroxide aqueous solution at a pH of 10 and at a temperature of 70° C., 10 g of the lithium cobalt oxide (A1) was put. After stirring for dispersion, 0.0154 g of $Al(NO_3)_3 \cdot 9H_2O$ and an ammonium solution to suppress a pH fluctuation were dropped over a period of 5 hours, to produce an $Al(OH)_3$ coprecipitation matter, so as to adhere to the surface of the lithium cobalt oxide (A1). Then, the lithium cobalt oxide (A1) that the $Al(OH)_3$ coprecipitation matter were attached to was taken out from the reaction liquid. After washing and drying, a heat treatment was carried out at a temperature of 400° C. in the atmosphere for ten hours, thereby obtaining a positive electrode material (a1) in which a coating film of the Al-containing oxide was formed on the surface of the lithium cobalt oxide (A1). With respect to the positive electrode material (a1) obtained, its average particle diameter was measured by means of the method as described before, thereby finding that it was 27 μm.

$Li_2CO_3$ as a Li-containing compound, $Co_3O_4$ as a Co-containing compound, $Mg(OH)_2$ as a Mg-containing compound, and $Al(OH)_3$ as an Al-containing compound were put into a mortar at an appropriate mixture ratio, and mixed and hardened into a pellet form. Using a muffle furnace, it was burned at 950° C. in the atmosphere (in the atmospheric pressure) for 4 hours. Thereby obtained was a lithium cobalt oxide (B1) whose composition formula was found to be $LiCo_{0.97}Mg_{0.012}Al_{0.009}O_2$ by means of the ICP method.

Then, into 200 g of a lithium hydroxide aqueous solution at a pH of 10 and at a temperature of 70° C., 10 g of the lithium cobalt oxide (B1) was put. After stirring for dispersion, 0.077 g of $Al(NO_3)_3 \cdot 9H_2O$ and an ammonium solution to suppress a pH fluctuation were dropped over a period of 5 hours, to produce an $Al(OH)_3$ coprecipitation matter, so as to adhere to the surface of the lithium cobalt oxide (B1). Then, the lithium cobalt oxide (B1) that the $Al(OH)_3$ coprecipitation matter were attached to was taken out from the reaction liquid. After washing and drying, a heat treatment was carried out at a temperature of 400° C. in the atmosphere for ten hours, thereby obtaining a positive electrode material (b1) in which a coating film of the Al-containing oxide was formed on the surface of the lithium cobalt oxide (B1). With respect to the positive electrode material (b1) obtained, its average particle diameter was measured by means of the method as described before, thereby finding that it was 7 μm.

Then, the positive electrode material (a1) and the positive electrode material (b1) were mixed at a mass ratio of 85:15 to obtain a positive electrode material (1) for battery preparation. The average coating thickness of the Al-containing oxide formed on the surface of the positive electrode material (1) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (1) was analyzed on the particle size distribution by volume standard. It was found that its average particle diameter was 25 μm, and that there were two peaks, each having the peak top corresponding to the average particle diameter of the positive electrode material (a1) or the positive electrode material (b1). In addition, the BET specific surface area of the positive electrode material (1) was measured by using a specific surface area measurement device by means of a nitrogen adsorption method, thereby finding that it was 0.25 $m^2/g$.

96.5 parts by mass of the positive electrode material (1), 20 parts by mass of an NMP solution containing PVDF as a binder at a concentration of 10 mass %, and 1.5 parts by mass of acetylene black as a conductive assistant were kneaded with a twin screw extruder, into which an NMP was further added to adjust a viscosity, so as to prepare a positive electrode composition containing paste.

The positive electrode composition containing paste was applied on one surface or both surfaces of an aluminum foil (a positive electrode current collector) having a thickness of 15 μm, and then, dried at 120° C. for 12 hours in vacuum to obtain a positive electrode composition layer having formed on one surface or both surfaces of the aluminum foil. Then, it was subject to a press work, and cut into a predetermined size to obtain a positive electrode in a belt shape. When applying the positive electrode composition containing paste on the aluminum foil, it was configured in such a way that the aluminum foil was partly exposed. When the positive electrode composition containing paste was applied on the both surfaces of the aluminum foil, the applied part thereof on the surface corresponded to that of the back surface. The thickness of the positive electrode composition layer of the positive electrode (when the positive electrode composition layer was formed on both surfaces of the aluminum foil, the thickness here was with respect to one surface) was 55 μm.

The positive electrode in the belt shape having formed the positive electrode composition layer on one surface of the aluminum foil, and the positive electrode in the belt shape having formed the positive electrode composition layer on both surfaces of the aluminum foil were punched with a Thompson blade, in such a way that the exposed part of the aluminum foil (i.e., the positive electrode current collector) was partly projected to become a tab part, and that the application part of the positive electrode composition layer was shaped into nearly a quadrangle having curved and rounded its four corners. Thereby obtained were a positive electrode for batteries having a positive electrode composition layer formed on one surface of the positive electrode current collector, and a positive electrode for batteries having a positive electrode composition layer formed on both surfaces of the positive electrode current collector. FIG. 1 is a plan view schematically showing the positive electrode for batteries (here, the size of the positive electrode shown in FIG. 1 does not necessarily correspond to the actual size in order to make it easy to understand the structure of the positive electrode). The positive electrode 10 has a shape serving as a tab part 13 formed by being punched in such a way that a part of the exposed part of the positive electrode current collector 12 was projected. The shape of the application part of the positive electrode composition layer 11 has nearly a quadrangle having the four corners curved. Each length of a, b and c in the drawing was 5 mm, 30 mm and 2 mm, respectively.

<Preparation of the Negative Electrode>

Provided was a mixture of graphite A having an average particle diameter, $d_{50}$ of 22 μm and $d_{002}$ of 0.338 nm, and a specific surface area of 3.8 m$^2$/g by means of the BET method (the graphite does not have a surface coated with an amorphous carbon); graphite B having an average particle diameter, $d_{50}$ of 10 μm and $d_{002}$ of 0.336 nm, and a specific surface area of 3.9 m$^2$/g by means of the BET method (the graphite has a structure in which the surface of the mother particles of the graphite is coated with an amorphous carbon); and a complex Si-1 in which the surface of SiO is coated with a carbon material (that is, the materials S having an average particle size of 8 μm, a specific surface area of 7.9 m$^2$/g, the quantity of the carbon materials in the complex being 20 mass %). The mixture above was mixed at a mass ratio of 25:25:50, respectively. 98 parts by mass of the mixture; 1.0 part by mass of CMC; 1.0 part by mass of SBR; and ion exchanged water were mixed, so as to prepare an aqueous negative electrode composition containing paste.

The negative electrode composition containing paste was applied on both surfaces of a copper foil having a thickness of 6 μm, and dried to form a negative electrode composition layer formed on both surfaces of the copper foil. After a press work process was applied to adjust the density of the negative electrode composition layer to be 1.4 g/cm$^3$, followed by cutting it with a predetermined size, to obtain a negative electrode having a belt shape. When applying the negative electrode composition containing paste on the copper foil, it was applied in such a way that the copper foil is partly exposed. Also, the applied part thereof on the surface corresponded to that of the back surface. The thickness of the negative electrode composition layer of the negative electrode obtained (that is, the thickness thereof formed on one surface of the copper foil as a negative electrode current collector) was 65 μm.

Figure 2:
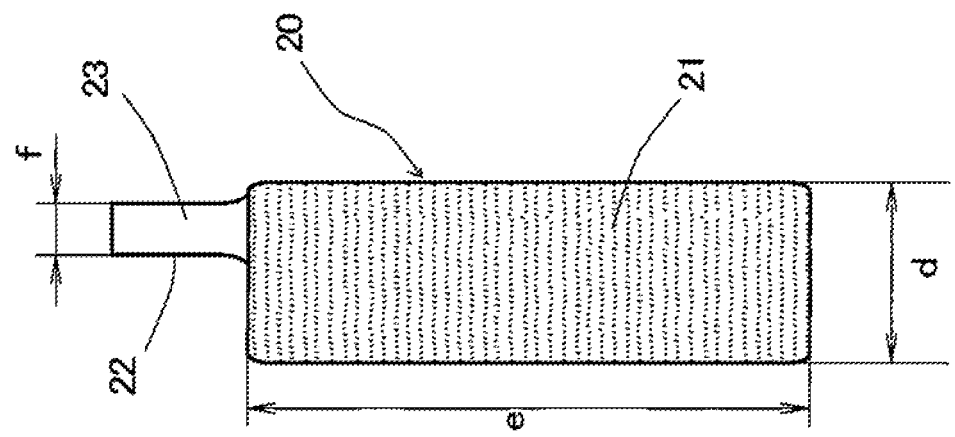
FIG. 2 is a plan view schematically showing an example of the negative electrode of the lithium ion secondary battery of the present invention.

The negative electrode in the belt shape as explained above was punched with a Thompson blade, in such a way that the exposed part of the copper foil (i.e., the negative electrode current collector) was partly projected to become a tab part, and that the application part of the negative electrode composition layer was shaped into nearly a quadrangle having curved and rounded its four corners. Thereby obtained was a negative electrode for batteries having a negative electrode composition layer formed on both surfaces of the negative electrode current collector. FIG. 2 is a plan view schematically showing the negative electrode for batteries (here, the size of the negative electrode shown in FIG. 2 does not necessarily correspond to the actual size in order to make it easy to understand the structure of the negative electrode). The negative electrode 20 has a shape serving as a tab part 23 formed by being punched in such a way that a part of the exposed part of the negative electrode current collector 22 was projected. The shape of the application part of the negative electrode composition layer 21 has nearly a quadrangle having the four corners curved. Each length of d, e and fin the drawing was 6 mm, 31 mm and 2 mm, respectively.

<Preparation of the Nonaqueous Electrolyte Liquid>

Into a mixture solvent of ethylene carbonate and diethyl carbonate at a volume ratio of 1:1, adiponitrile, 1,3-dioxane and vinylene carbonate were dissolved at contents of 1.0 mass %, 1.0 mass % and 3.0 mass %, respectively. Then, LiPF$_6$ was further dissolved there at a concentration of 1 mol/L to prepare a nonaqueous electrolyte liquid.

<Assembling of Battery>

A laminated electrode body was formed by using two sheets of the positive electrodes for batteries having formed the positive electrode composition layer on one surface of the positive electrode current collector; 14 sheets of the positive electrodes for batteries having formed the positive electrode composition layer on both surfaces of the positive electrode current collector; and 15 sheets of the negative electrodes for batteries having formed the negative electrode composition layer on both surfaces of the negative electrode current collector. In the laminated electrode body, the positive electrodes for batteries having formed the positive electrode composition layer on one surface of the positive electrode current collector were disposed at both ends at the top and the bottom thereof, in such a way that each current collector faces the outside. Between them, the negative electrodes for batteries having formed the negative electrode composition layer on both surfaces of the negative electrode current collector, and the positive electrodes for batteries having formed the positive electrode composition layer on both surfaces of the positive electrode current collector were alternatively disposed, while a separator made of a PE (thickness of 16 μm) was interposed between each positive electrode and each negative electrode. The tab parts of the positive electrode were welded together, while the tab parts of the negative electrode were also welded together, so as to prepare a laminated electrode body. A aluminum laminate film having a thickness of 0.15 mm, a width of 34 mm, a height of 50 mm and a cavity to house the laminated electrode body was provided. Into the cavity, the laminated electrode body was inserted, and on the top, another aluminum laminate film having the same size was placed. The three sides of the aluminum laminate films were welded together. From the remaining one side of the aluminum laminate films, the nonaqueous electrolyte liquid as explained above was injected. Then, said remaining one side of the aluminum laminated films was sealed by a vacuum heat process. Thereby obtained was the lithium ion secondary battery having an appearance shown in FIG. 3, and a cross sectional structure shown in FIG. 4.

Figure 3:
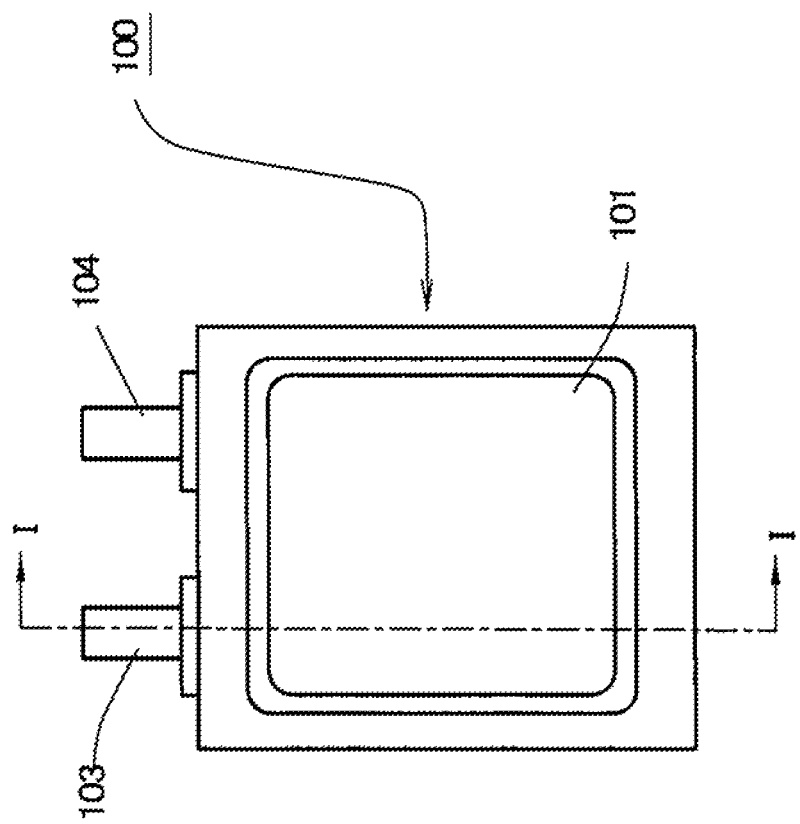
FIG. 3 is a plan view schematically showing an example of the lithium ion secondary battery of the present invention.
Figure 4:
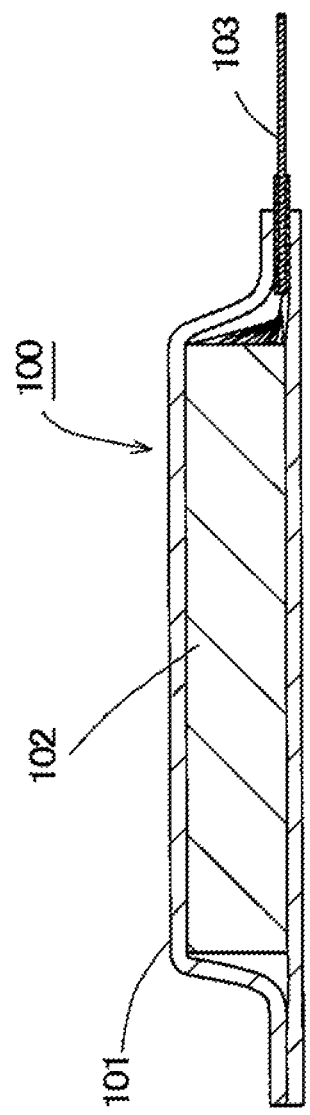
FIG. 4 is a cross section view of FIG. 3 at the line I-I.

Here, FIG. 3 and FIG. 4 are explained. FIG. 3 is a plan view schematically showing a lithium ion secondary battery, and FIG. 4 is a cross section view at line I-I of FIG. 3. The lithium ion secondary battery 100 has a structure below. Inside the aluminum laminate film exterior body 101 composed of two sheets of aluminum laminate films, there are provided the laminated electrode body 102 provided by laminating the positive electrode and the negative electrode with intervention of a separator, and the nonaqueous electrolyte liquid (not shown). The aluminum laminate film exterior body 101 has a structure in which the outer periphery thereof is sealed by heat fusion of the aluminum laminate films at the top and bottom. It is noted that in FIG. 4, illustration of the drawing is simplified, such that it does not show each layer constituting the aluminum laminate film exterior body 101, and the positive electrode, negative electrode and a separator constituting the laminated electrode body is not distinctively illustrated.

The positive electrodes in the laminated electrode body 102 are connected with each other by welding the tab parts to be unified. The unified body of the tab parts welded in this way is connected to the positive electrode external terminal 103 inside battery 100. In addition, while not illustrated, the negative electrodes in the laminated electrode body 102 are also connected with each other by welding the tab parts to be unified, and the unified body of the tab parts welded in this way is connected to the negative electrode external terminal 104 inside battery 100. Then, each one end of the positive electrode external terminal 103 and the negative electrode external terminal 104 is drawn outside the aluminum laminate film exterior body 101 in order to be capable of connection to external devices.

The lithium ion secondary battery as prepared above was kept in a constant temperature bath at 60° C. for 24 hours.

Example 2

The lithium cobalt oxide (A1) that the Al(OH)$_3$ coprecipitation matter were attached to was taken out, washed and dried, and then a heat treatment was carried out at a temperature of 200° C. in the atmosphere. Other than the change of the temperature noted here, the same procedure as Example 1 was carried out to prepare a positive electrode material (a2). With respect to the positive electrode material (a2) obtained, its average particle diameter was measured by means of the method as described before, thereby finding that it was 27 µm.

The lithium cobalt oxide (B1) that the Al(OH)$_3$ coprecipitation matter were attached to was taken out, washed and dried, and then a heat treatment was carried out at a temperature of 200° C. in the atmosphere. Other than the change of the temperature noted here, the same procedure as Example 1 was carried out to prepare a positive electrode material (b2). With respect to the positive electrode material (b2) obtained, its average particle diameter was measured by means of the method as described before, thereby finding that it was 7 µm.

Then, the positive electrode material (a2) and the positive electrode material (b2) were mixed at a mass ratio of 85:15 to obtain a positive electrode material (2) for battery preparation. The average coating thickness of the Al-containing oxide formed on the surface of the positive electrode material (2) was measured by means of the method described before, thereby finding that it was 30 nm. In addition, when measuring the average coating thickness, the composition of the coating film was analyzed by an element mapping method, thereby confirming that the main component was AlOOH. Furthermore, the positive electrode material (2) was analyzed on the particle size distribution by volume standard. It was found that its average particle diameter was 25 µm, and that there were two peaks, each having the peak top corresponding to the average particle diameter of the positive electrode material (a2) or the positive electrode material (b2). In addition, the BET specific surface area of the positive electrode material (2) was measured by using a specific surface area measurement device by means of a nitrogen adsorption method, thereby finding that it was 0.25 m$^2$/g.

Except for replacing the positive electrode material (1) with the positive electrode material (2), the same procedure as Example 1 was carried out to prepare a positive electrode, and except for using this positive electrode, the same procedure as Example 1 was carried out to prepare a lithium ion secondary battery.

Example 3

The lithium cobalt oxide (A1) that the Al(OH)$_3$ coprecipitation matter were attached to was taken out, washed and dried, and then a heat treatment was carried out at a temperature of 700° C. in the atmosphere. Other than the change of the temperature noted here, the same procedure as Example 1 was carried out to prepare a positive electrode material (a3). With respect to the positive electrode material (a3) obtained, its average particle diameter was measured by means of the method as described before, thereby finding that it was 27 µm.

The lithium cobalt oxide (B1) that the Al(OH)$_3$ coprecipitation matter were attached to was taken out, washed and dried, and then a heat treatment was carried out at a temperature of 700° C. in the atmosphere. Other than the change of the temperature noted here, the same procedure as Example 1 was carried out to prepare a positive electrode material (b3). With respect to the positive electrode material (b3) obtained, its average particle diameter was measured by means of the method as described before, thereby finding that it was 7 µm.

Then, the positive electrode material (a3) and the positive electrode material (b3) were mixed at a mass ratio of 85:15 to obtain a positive electrode material (3) for battery preparation. The average coating thickness of the Al-containing oxide formed on the surface of the positive electrode material (3) was measured by means of the method described before, thereby finding that it was 30 nm. In addition, when measuring the average coating thickness, the composition of the coating film was analyzed by an element mapping method, thereby confirming that the main component was LiAlO$_2$. Furthermore, the positive electrode material (3) was analyzed on the particle size distribution by volume standard. It was found that its average particle diameter was 25 µm, and that there were two peaks, each having the peak top corresponding to the average particle diameter of the positive electrode material (a3) or the positive electrode material (b3). In addition, the BET specific surface area of the positive electrode material (3) was measured by using a specific surface area measurement device by means of a nitrogen adsorption method, thereby finding that it was 0.25 m$^2$/g.

Except for replacing the positive electrode material (1) with the positive electrode material (3), the same procedure as Example 1 was carried out to prepare a positive electrode, and except for using this positive electrode, the same procedure as Example 1 was carried out to prepare a lithium ion secondary battery.

Example 4

Except for changing the quantity of $Al(NO_3)_3 \cdot 9H_2O$ into 0.0026 g, the same procedure as producing the positive electrode material (a1) was carried out to prepare a positive electrode material (a4). With respect to the positive electrode material (a4) obtained, its average particle diameter was measured by means of the method as described before, thereby finding that it was 27 μm.

In addition, except for changing the quantity of $Al(NO_3)_3 \cdot 9H_2O$ into 0.013 g, the same procedure as producing the positive electrode material (b1) was carried out to prepare a positive electrode material (b4). With respect to the positive electrode material (b4) obtained, its average particle diameter was measured by means of the method as described before, thereby finding that it was 7 μm.

Then, the positive electrode material (a4) and the positive electrode material (b4) were mixed at a mass ratio of 85:15 to obtain a positive electrode material (4) for battery preparation. The average coating thickness of the Al-containing oxide formed on the surface of the positive electrode material (4) was measured by means of the method described before, thereby finding that it was 5 nm. In addition, when measuring the average coating thickness, the composition of the coating film was analyzed by an element mapping method, thereby confirming that the main component was $Al_2O_3$. Furthermore, the positive electrode material (4) was analyzed on the particle size distribution by volume standard. It was found that its average particle diameter was 25 μm, and that there were two peaks, each having the peak top corresponding to the average particle diameter of the positive electrode material (a4) or the positive electrode material (b4). In addition, the BET specific surface area of the positive electrode material (4) was measured by using a specific surface area measurement device by means of a nitrogen adsorption method, thereby finding that it was 0.25 $m^2/g$.

Except for replacing the positive electrode material (1) with the positive electrode material (4), the same procedure as Example 1 was carried out to prepare a positive electrode, and except for using this positive electrode, the same procedure as Example 1 was carried out to prepare a lithium ion secondary battery.

Example 5

Except for changing the quantity of $Al(NO_3)_3 \cdot 9H_2O$ into 0.128 g, the same procedure as producing the positive electrode material (a1) was carried out to prepare a positive electrode material (a5). With respect to the positive electrode material (a5) obtained, its average particle diameter was measured by means of the method as described before, thereby finding that it was 27 μm.

In addition, except for changing the quantity of $Al(NO_3)_3 \cdot 9H_2O$ into 0.0256 g, the same procedure as producing the positive electrode material (b1) was carried out to prepare a positive electrode material (b5). With respect to the positive electrode material (b5) obtained, its average particle diameter was measured by means of the method as described before, thereby finding that it was 7 μm.

Then, the positive electrode material (a5) and the positive electrode material (b5) were mixed at a mass ratio of 85:15 to obtain a positive electrode material (5) for battery preparation. The average coating thickness of the Al-containing oxide formed on the surface of the positive electrode material (5) was measured by means of the method described before, thereby finding that it was 50 nm. In addition, when measuring the average coating thickness, the composition of the coating film was analyzed by an element mapping method, thereby confirming that the main component was $Al_2O_3$. Furthermore, the positive electrode material (5) was analyzed on the particle size distribution by volume standard. It was found that its average particle diameter was 25 μm, and that there were two peaks, each having the peak top corresponding to the average particle diameter of the positive electrode material (a5) or the positive electrode material (b5). In addition, the BET specific surface area of the positive electrode material (5) was measured by using a specific surface area measurement device by means of a nitrogen adsorption method, thereby finding that it was 0.25 $m^2/g$.

Except for replacing the positive electrode material (1) with the positive electrode material (5), the same procedure as Example 1 was carried out to prepare a positive electrode, and except for using this positive electrode, the same procedure as Example 1 was carried out to prepare a lithium ion secondary battery.

Example 6

The positive electrode material (a1) and the positive electrode material (b1) were mixed at a mass ratio of 95:5 to obtain a positive electrode material (6) for battery preparation. The average coating thickness of the Al-containing oxide formed on the surface of the positive electrode material (6) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (6) was analyzed on the particle size distribution by volume standard. It was found that its average particle diameter was 25 μm, and that there were two peaks, each having the peak top corresponding to the average particle diameter of the positive electrode material (a1) or the positive electrode material (b1). In addition, the BET specific surface area of the positive electrode material (6) was measured by using a specific surface area measurement device by means of a nitrogen adsorption method, thereby finding that it was 0.1 $m^2/g$.

Except for replacing the positive electrode material (1) with the positive electrode material (6), the same procedure as Example 1 was carried out to prepare a positive electrode, and except for using this positive electrode, the same procedure as Example 1 was carried out to prepare a lithium ion secondary battery.

Example 7

The positive electrode material (a1) and the positive electrode material (b1) were mixed at a mass ratio of 70:30 to obtain a positive electrode material (7) for battery preparation. The average coating thickness of the Al-containing oxide formed on the surface of the positive electrode material (7) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (7) was analyzed on the particle size distribution by volume standard. It was found that its average particle diameter was 25 µm, and that there were two peaks, each having the peak top corresponding to the average particle diameter of the positive electrode material (a1) or the positive electrode material (b1). In addition, the BET specific surface area of the positive electrode material (7) was measured by using a specific surface area measurement device by means of a nitrogen adsorption method, thereby finding that it was 0.4 $m^2/g$.

Except for replacing the positive electrode material (1) with the positive electrode material (7), the same procedure as Example 1 was carried out to prepare a positive electrode, and except for using this positive electrode, the same procedure as Example 1 was carried out to prepare a lithium ion secondary battery.

Example 8

Except for omitting the addition of adiponitrile, the same procedure as Example 1 was carried out to prepare a nonaqueous electrolyte liquid, and except for using this nonaqueous electrolyte liquid, the same procedure as Example 1 was carried out to prepare a lithium ion secondary battery.

Example 9

Except for omitting the addition of 1,3-dioxane, the same procedure as Example 1 was carried out to prepare a nonaqueous electrolyte liquid, and except for using this nonaqueous electrolyte liquid, the same procedure as Example 1 was carried out to prepare a lithium ion secondary battery.

Example 10

96.5 parts by mass of a mixture of the positive electrode material (1) and a lithium nickel oxide (composition formula: $LiNi_{0.85}Co_{0.120}Mg_{0.01}Al_{0.02}O_2$) at a mass ratio of 80:20; 20 parts by mass of an NMP solution containing PVDF as a binder at a concentration of 10 mass %, and 1.5 parts by mass of acetylene black as a conductive assistant were kneaded with a twin screw extruder, into which an NMP was further added to adjust a viscosity, so as to prepare a positive electrode composition containing paste.

Except for using the positive electrode composition containing paste above, the same procedure as Example 1 was carried out to prepare a positive electrode, and except for using this positive electrode, the same procedure as Example 1 was carried out to prepare a lithium ion secondary battery.

Example 11

Except for replacing the lithium nickel oxide with $LiNi_{0.82}Co_{0.16}Al_{0.02}O_2$, the same procedure as Example 10 was carried out to prepare a positive electrode, and except for using this positive electrode, the same procedure as Example 1 was carried out to prepare a lithium ion secondary battery.

Example 12

$Li_2CO_3$ as a Li-containing compound, $Co_3O_4$ as a Co-containing compound, $Mg(OH)_2$ as a Mg-containing compound, and $Al(OH)_3$ as an Al-containing compound were put into a mortar at an appropriate mixture ratio, and mixed and hardened into a pellet form. Using a muffle furnace, it was burned at 950° C. in the atmosphere (in the atmospheric pressure) for 24 hours. Thereby obtained was a lithium cobalt oxide (A12) whose composition formula was found to be $LiCo_{0.9881}Mg_{0.011}Al_{0.0009}O_2$ by means of the ICP method.

Except for replacing the lithium cobalt oxide (A1) with the lithium cobalt oxide (A12), the same procedure as producing the positive electrode material (a1) was carried out to prepare a positive electrode material (a12). With respect to the positive electrode material (a12) obtained, its average particle diameter was measured by means of the method as described before, thereby finding that it was 27 µm.

Then, the positive electrode material (a12) and the positive electrode material (b1) were mixed at a mass ratio of 85:15 to obtain a positive electrode material (12) for battery preparation. The average coating thickness of the Al-containing oxide formed on the surface of the positive electrode material (12) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (12) was analyzed on the particle size distribution by volume standard. It was found that its average particle diameter was 25 µm, and that there were two peaks, each having the peak top corresponding to the average particle diameter of the positive electrode material (a12) or the positive electrode material (b1). In addition, the BET specific surface area of the positive electrode material (12) was measured by using a specific surface area measurement device by means of a nitrogen adsorption method, thereby finding that it was 0.25 $m^2/g$.

Except for replacing the positive electrode material (1) with the positive electrode material (12), the same procedure as Example 1 was carried out to prepare a positive electrode, and except for using this positive electrode, the same procedure as Example 1 was carried out to prepare a lithium ion secondary battery.

Example 13

$Li_2CO_3$ as a Li-containing compound, $Co_3O_4$ as a Co-containing compound, and $ZrO_2$ as a Zr-containing compound were put into a mortar at an appropriate mixture ratio, and mixed and hardened into pellet form. Using a muffle furnace, it was burned at 950° C. in the atmosphere (in the atmospheric pressure) for 24 hours. Thereby obtained was a lithium cobalt oxide (A13) whose composition formula was found to be $LiCo_{0.9995}Zr_{0.0005}O_2$ by means of the ICP method.

Except for replacing the lithium cobalt oxide (A1) with the lithium cobalt oxide (A13), the same procedure as producing the positive electrode material (a1) was carried out to prepare a positive electrode material (a13). With respect to the positive electrode material (a13) obtained, its average particle diameter was measured by means of the method as described before, thereby finding that it was 27 µm.

$Li_2CO_3$ as a Li-containing compound, $Co_3O_4$ as a Co-containing compound, and $ZrO_2$ as a Zr-containing compound were put into a mortar at an appropriate mixture ratio, and mixed and hardened into pellet form. Using a muffle furnace, it was burned at 950° C. in the atmosphere (in the atmospheric pressure) for 4 hours. Thereby obtained was a lithium cobalt oxide (B13) whose composition formula was found to be $LiCo_{0.9995}Zr_{0.0005}O_2$ by means of the ICP method.

Except for replacing the lithium cobalt oxide (B1) with the lithium cobalt oxide (B13), the same procedure as producing the positive electrode material (b1) was carried out to prepare a positive electrode material (b13). With respect to the positive electrode material (b13) obtained, its average particle diameter was measured by means of the method as described before, thereby finding that it was 7 μm.

Then, the positive electrode material (a13) and the positive electrode material (b13) were mixed at a mass ratio of 85:15 to obtain a positive electrode material (13) for battery preparation. The average coating thickness of the Al-containing oxide formed on the surface of the positive electrode material (13) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (13) was analyzed on the particle size distribution by volume standard. It was found that its average particle diameter was 25 μm, and that there were two peaks, each having the peak top corresponding to the average particle diameter of the positive electrode material (a13) or the positive electrode material (b13). In addition, the BET specific surface area of the positive electrode material (13) was measured by using a specific surface area measurement device by means of a nitrogen adsorption method, thereby finding that it was 0.25 $m^2/g$.

Except for replacing the positive electrode material (1) with the positive electrode material (13), the same procedure as Example 1 was carried out to prepare a positive electrode, and except for using this positive electrode, the same procedure as Example 1 was carried out to prepare a lithium ion secondary battery.

Example 14

A Li foil having a thickness of 30 μm was punched through to be disposed on a part of the surface of both of the negative electrode composition layers of the negative electrode, which had been prepared in the same manner as Example 1. The total weight of the Li foil provided on one side of the negative electrode was 0.5 mg. This procedure was carried out in a glove box with an argon gas atmosphere. Except for using this negative electrode, the same procedure as Example 1 was carried out to prepare a lithium ion secondary battery.

Example 15

The paste for the negative electrode composition prepared in Example 1 was applied to both surfaces of the copper foil (the thickness was 10 μm, the through hole diameter was 0.3 mm, and the pitch between the through hole was 2 mm) having a through hole penetrating from one surface thereof to the other surface thereof, followed by drying. Thereby, a negative electrode composition layer was formed on both surfaces of the copper foil. After a press work process was applied to adjust the density of the negative electrode composition layer to be 1.4 $g/cm^3$, and cut into a predetermined size, so as to obtain a negative electrode having a belt shape.

A Li foil having a thickness of 30 μm was punched through to be disposed on a part of the surface of one of the negative electrode composition layers of the negative electrode as explained above. The weight of the Li foil provided on one side of the negative electrode was 0.5 mg. This procedure was carried out in a glove box with an argon gas atmosphere.

Except for using this negative electrode, the same procedure as Example 1 was carried out to prepare a lithium ion secondary battery.

Example 16

Except for preparing a negative electrode composition containing paste by mixing graphite A, graphite B, and Si-1 at a mass ratio of 45:45:10, the same procedure as Example 1 was carried out to prepare a negative electrode, and except for using this negative electrode, the same procedure as Example 1 was carried out to prepare a lithium ion secondary battery.

Example 17

Except for using Si-1 alone as a negative electrode active material, the same procedure as Example 1 was carried out to prepare a negative electrode composition containing paste, and except for using this negative electrode composition containing paste, the same procedure as Example 1 was carried out to prepare a lithium ion secondary battery.

A Li foil having a thickness of 30 μm was punched through to be disposed on a part of the surface of both of the negative electrode composition layers of the negative electrode as explained above. The total weight of the Li foil provided on one side of the negative electrode was 1.0 mg. This procedure was carried out in a glove box with an argon gas atmosphere.

Except for using this negative electrode, the same procedure as Example 1 was carried out to prepare a lithium ion secondary battery.

Example 18

The positive electrode material (a1) and the positive electrode material (b1) were mixed at a mass ratio of 15:85 to obtain a positive electrode material (18) for battery preparation. The average coating thickness of the Al-containing oxide formed on the surface of the positive electrode material (18) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (18) was analyzed on the particle size distribution by volume standard. It was found that its average particle diameter was 25 μm, and that there were two peaks, each having the peak top corresponding to the average particle diameter of the positive electrode material (a1) or the positive electrode material (b1). In addition, the BET specific surface area of the positive electrode material (18) was measured by using a specific surface area measurement device by means of a nitrogen adsorption method, thereby finding that it was 0.5 $m^2/g$.

Except for replacing the positive electrode material (1) with the positive electrode material (18), the same procedure as Example 1 was carried out to prepare a positive electrode, and except for using this positive electrode, the same procedure as Example 1 was carried out to prepare a lithium ion secondary battery.

Example 19

Except for replacing the positive electrode material (1) with the positive electrode material (18), the same procedure as Example 1 was carried out to prepare a positive electrode.

Into a mixture solvent of ethylene carbonate and diethyl carbonate at a volume ratio of 1:1, adiponitrile, 1,3-dioxane and vinylene carbonate were dissolved at contents of 2.0 mass %, 1.0 mass % and 3.0 mass %, respectively. Then, $LiPF_6$ was further dissolved there at a concentration of 1 mol/L to prepare a nonaqueous electrolyte liquid.

Except for using the positive electrode and the nonaqueous electrolyte liquid mentioned above, the same procedure as Example 1 was carried out to prepare a lithium ion secondary battery.

Comparative Example 1

Without providing the coating by the Al-containing oxide the same procedure as the positive electrode material (a1) was carried out to prepare a positive electrode material (c1). In addition, without providing the coating by the Al-containing oxide, the same procedure as the positive electrode material (b1) was carried out to prepare a positive electrode material (d1). The average particle diameters of the positive electrode material (c1) and the positive electrode material (d1) were 27 μm and 7 μm, respectively.

Then, the positive electrode material (c1) and the positive electrode material (d1) were mixed at a mass ratio of 85:15 to obtain a positive electrode material (101) for battery preparation. Furthermore, the positive electrode material (101) as obtained was analyzed on the particle size distribution by volume standard. It was found that its average particle diameter was 25 μm, and that there were two peaks, each having the peak top corresponding to the average particle diameter of the positive electrode material (c1) or the positive electrode material (d1). In addition, the BET specific surface area of the positive electrode material (101) was measured by using a specific surface area measurement device by means of a nitrogen adsorption method, thereby finding that it was 0.25 $m^2/g$.

Except for replacing the positive electrode material (1) with the positive electrode material (101), the same procedure as Example 1 was carried out to prepare a positive electrode, and except for using this positive electrode, the same procedure as Example 1 was carried out to prepare a lithium ion secondary battery.

Comparative Example 2

Except for changing the quantity of $Al(NO_3)_3 \cdot 9H_2O$ into 0.154 g, the same procedure as producing the positive electrode material (a1) was carried out to prepare a positive electrode material (c2). With respect to the positive electrode material (c2) obtained, its average particle diameter was measured by means of the method as described before, thereby finding that it was 27 μm.

In addition, except for changing the quantity of $Al(NO_3)_3 \cdot 9H_2O$ into 0.0308 g, the same procedure as producing the positive electrode material (b1) was carried out to prepare a positive electrode material (d2). With respect to the positive electrode material (d2) obtained, its average particle diameter was measured by means of the method as described before, thereby finding that it was 7 μm.

Then, the positive electrode material (c2) and the positive electrode material (d2) were mixed at a mass ratio of 85:15 to obtain a positive electrode material (102) for battery preparation.

The average coating thickness of the Al-containing oxide formed on the surface of the positive electrode material (102) was measured by means of the method described before, thereby finding that it was 60 nm.

In addition, when measuring the average coating thickness, the composition of the coating film was analyzed by an element mapping method, thereby confirming that the main component was $Al_2O_3$.

Furthermore, the positive electrode material (102) was analyzed on the particle size distribution by volume standard.

It was found that its average particle diameter was 25 μm, and that there were two peaks, each having the peak top corresponding to the average particle diameter of the positive electrode material (c2) or the positive electrode material (d2). In addition, the BET specific surface area of the positive electrode material (102) was measured by using a specific surface area measurement device by means of a nitrogen adsorption method, thereby finding that it was 0.25 $m^2/g$.

Except for replacing the positive electrode material (1) with the positive electrode material (102), the same procedure as Example 1 was carried out to prepare a positive electrode, and except for using this positive electrode, the same procedure as Example 1 was carried out to prepare a lithium ion secondary battery.

Comparative Example 3

Except for using a negative electrode composition containing paste by mixing graphite A and graphite B at a mass ratio of 50:50 as a negative electrode active material, the same procedure as Example 1 was carried out to prepare a negative electrode composition containing paste, and except for using this negative electrode composition containing paste, the same procedure as Example 1 was carried out to prepare a lithium ion secondary battery.

Comparative Example 4

Except for not using $Mg(OH)_2$, $Al(OH)_3$ and $ZrO_2$, the same procedure as producing the lithium cobalt oxide (A1) was carried out to produce lithium cobalt oxide (C4) having a composition formula of $LiCoO_2$ determined by the ICP method.

Except for replacing the lithium cobalt oxide (A1) with the lithium cobalt oxide (C4), the same procedure as producing the positive electrode material (a1) was carried out to prepare a positive electrode material (c4). With respect to the positive electrode material (c4) obtained, its average particle diameter was measured by means of the method as described before, thereby finding that it was 27 μm.

Except for not using $Mg(OH)_2$ and $Al(OH)_3$, the same procedure as producing the lithium cobalt oxide (B1) was carried out to produce lithium cobalt oxide (D4) having a composition formula of $LiCoO_2$ determined by the ICP method.

Except for replacing the lithium cobalt oxide (A1) with the lithium cobalt oxide (D4), the same procedure as producing the positive electrode material (a1) was carried out to prepare a positive electrode material (d4). With respect to the positive electrode material (d4) obtained, its average particle diameter was measured by means of the method as described before, thereby finding that it was 7 μm.

Then, the positive electrode material (c4) and the positive electrode material (d4) were mixed at a mass ratio of 85:15 to obtain a positive electrode material (104) for battery preparation. The average coating thickness of the Al-containing oxide formed on the surface of the positive electrode material (104) was measured by means of the method described before, thereby finding that it was 30 nm. In addition, when measuring the average coating thickness, the composition of the coating film was analyzed by an element mapping method, thereby confirming that the main component was $Al_2O_3$. Furthermore, the positive electrode material (104) was analyzed on the particle size distribution by volume standard. It was found that its average particle diameter was 25 μm, and that there were two peaks, each having the peak top corresponding to the average particle diameter of the positive electrode material (c4) or the positive electrode material (d4). In addition, the BET specific surface area of the positive electrode material (104) was measured by using a specific surface area measurement device by means of a nitrogen adsorption method, thereby finding that it was 0.25 $m^2/g$.

Except for replacing the positive electrode material (1) with the positive electrode material (104), the same procedure as Example 1 was carried out to prepare a positive electrode, and except for using this positive electrode, the same procedure as Example 1 was carried out to prepare a lithium ion secondary battery.

The structure of each lithium ion secondary battery of the Examples and the Comparative Examples is shown in Tables 1 to 3.

In addition, each lithium ion secondary battery of the Examples and the Comparative Examples were evaluated on the battery properties below. The results of the evaluation of each battery are shown in Table 4.

<Measurement of the Li Quantity in the Positive Electrode Active Material>

A lithium ion secondary battery was kept in a constant temperature bath at 45° C. for 24 hours, and then, discharged at a discharge current rate of 0.1 C to reach a voltage of 2.0V. Then, the aluminum laminate was disassembled inside a glove box, to take out the positive electrode alone. Thereby taken positive electrode was washed with diethyl carbonate, and then, the positive electrode composition layer was taken out. By means of the ICP method as mentioned above, the metal composition ratio of Li and metals other than Li, Li/M (Li; the quantity of Li; M: the quantity of the metals other than Li) was calculated.

<Evaluation on the Initial Discharge Capacity and Charge Discharge Cycle Characteristic>

The lithium ion secondary battery of Examples and the Comparative Examples (note that the samples were different from those used for calculating the Li/M explained above) was kept still in a constant temperature bath at 25° C. for five hours. Then, each battery was charged with a constant current at a current value of 0.5 C to reach 4.4V. Continuously, it was charged at a constant voltage at 4.4V (a total charge time of the constant current charge and the constant voltage charge was 2.5 hours). Then, it was discharged with a constant current of 0.2 C to reach 2.0V, so as to determine the initial discharge capacity. Then, each battery was charged at a constant current at a current value of 1 C to reach 4.4V, and continuously, it was charged at a constant voltage of 4.4V to reach a current value of 0.05 C, followed by discharging it at a current value of 1 C to reach a voltage of 2.0V. These sequences are assumed to be one cycle. This cycle was repeated 300 times. Then, each battery was charged with a constant current and constant-voltage and discharged with a constant current at the condition same as having measured the initial discharge capacity, so as to obtain a discharge capacity. Then, the value of the discharge capacity was divided by the value of the initial discharge capacity to show it as a percentage, that is, a capacity maintenance rate (cycle maintenance rate). It is noted that the initial discharge capacity is a ratio when the discharge capacity of Comparative Example 3 is assumed as 100%.

<Load Characteristic>

The same sample as the positive electrode used for each lithium ion secondary battery of the Examples and the Comparative Examples was provided. A lithium foil was provided as an opposite electrode. The same sample as the nonaqueous electrolyte liquid used in the lithium ion secondary battery of Example 1 was provided. Using these, model cells were prepared. Then, each model cell was charged with a constant current at 23° C. at a current value of 0.1 C to reach 4.5V with respect to the electric potential of lithium, and then, it was charged with a constant voltage of 4.5V with respect to the electric potential of lithium to reach a current value of 0.01 C, so as to measure a charge capacity. Each model cell after the charge was discharged with a constant current at a current value of 0.1 C to reach 3.1V with respect to the electric potential of lithium, thereby measuring a discharge capacity (0.1 C discharge capacity).

Also, except for changing the current value into 0.5 C at the time of the constant current charge and the constant current discharge, each model cell was charged with a constant current, charged with a constant voltage, and discharged with a constant current in the same conditions as when measuring the 0.1 C discharge capacity. Thereby, a charge capacity and a discharge capacity (0.5 C discharge capacity) were measured.

Then, with respect to each cell, the value of the 0.5 C discharge capacity was divided by the value of the 0.1 C discharge capacity and then, shown as a percentage to obtain a load characteristic.

TABLE 1

| | Positive electrode material | | | | | | |
|---|---|---|---|---|---|---|---|
| | Al-containing oxide | | Specific | Positive electrode material used | | | |
| | Main component | Coating thickness (μm) | surface area ($m^2/g$) | larger particle diameter | | smaller particle diameter | | lithium nickel oxide |
| | | | | No. | Element M | No. | Element M | |
| Example 1 | $Al_2O_3$ | 30 | 0.25 | a1 | Al, Mg, Zr | b1 | Al, Mg | None |
| Example 2 | AlOOH | 30 | 0.25 | a2 | Al, Mg, Zr | b2 | Al, Mg | None |
| Example 3 | $LiAlO_2$ | 30 | 0.25 | a3 | Al, Mg, Zr | b3 | Al, Mg | None |

TABLE 1-continued

| | Positive electrode material | | | | | | |
|---|---|---|---|---|---|---|---|
| | Al-containing oxide | | Specific | Positive electrode material used | | | |
| | | | surface | larger particle diameter | | smaller particle diameter | | lithium |
| | Main component | Coating thickness (μm) | area (m²/g) | No. | Element M | No. | Element M | nickel oxide |
| Example 4 | $Al_2O_3$ | 5 | 0.25 | a4 | Al, Mg, Zr | b4 | Al, Mg | None |
| Example 5 | $Al_2O_3$ | 50 | 0.25 | a5 | Al, Mg, Zr | b5 | Al, Mg | None |
| Example 6 | $Al_2O_3$ | 30 | 0.1 | a1 | Al, Mg, Zr | b1 | Al, Mg | None |
| Example 7 | $Al_2O_3$ | 30 | 0.4 | a1 | Al, Mg, Zr | b1 | Al, Mg | None |
| Example 8 | $Al_2O_3$ | 30 | 0.25 | a1 | Al, Mg, Zr | b1 | Al, Mg | None |
| Example 9 | $Al_2O_3$ | 30 | 0.25 | a1 | Al, Mg, Zr | b1 | Al, Mg | None |
| Example 10 | $Al_2O_3$ | 30 | 0.25 | a1 | Al, Mg, Zr | b1 | Al, Mg | Yes |
| Example 11 | $Al_2O_3$ | 30 | 0.25 | a1 | Al, Mg, Zr | b1 | Al, Mg | Yes |
| Example 12 | $Al_2O_3$ | 30 | 0.25 | a12 | Al, Mg | b1 | Al, Mg | None |
| Example 13 | $Al_2O_3$ | 30 | 0.25 | a13 | Zr | b13 | Zr | None |
| Example 14 | $Al_2O_3$ | 30 | 0.25 | a1 | Al, Mg, Zr | b1 | Al, Mg | None |
| Example 15 | $Al_2O_3$ | 30 | 0.25 | a1 | Al, Mg, Zr | b1 | Al, Mg | None |
| Example 16 | $Al_2O_3$ | 30 | 0.25 | a1 | Al, Mg, Zr | b1 | Al, Mg | None |
| Example 17 | $Al_2O_3$ | 30 | 0.25 | a1 | Al, Mg, Zr | b1 | Al, Mg | None |
| Example 18 | $Al_2O_3$ | 30 | 0.5 | a1 | Al, Mg, Zr | b1 | Al, Mg | None |
| Example 19 | $Al_2O_3$ | 30 | 0.5 | a1 | Al, Mg, Zr | b1 | Al, Mg | None |
| Comp. Example 1 | — | — | 0.25 | c1 | Al, Mg, Zr | d1 | Al, Mg | None |
| Comp. Example 2 | $Al_2O_3$ | 60 | 0.25 | c2 | Al, Mg, Zr | d2 | Al, Mg | None |
| Comp. Example 3 | $Al_2O_3$ | 30 | 0.25 | a1 | Al, Mg, Zr | b1 | Al, Mg | None |
| Comp. Example 4 | $Al_2O_3$ | 30 | 0.25 | c4 | None | d4 | None | None |

TABLE 2

| | Negative electrode material (mass %) | | | Amount of Li disposed (mg) | Li/M ratio |
|---|---|---|---|---|---|
| | Graphite | | | | |
| | A | B | Si-1 | | |
| Example 1 | 25 | 25 | 50 | None | 0.81 |
| Example 2 | 25 | 25 | 50 | None | 0.81 |
| Example 3 | 25 | 25 | 50 | None | 0.81 |
| Example 4 | 25 | 25 | 50 | None | 0.81 |
| Example 5 | 25 | 25 | 50 | None | 0.81 |
| Example 6 | 25 | 25 | 50 | None | 0.81 |
| Example 7 | 25 | 25 | 50 | None | 0.81 |
| Example 8 | 25 | 25 | 50 | None | 0.81 |
| Example 9 | 25 | 25 | 50 | None | 0.81 |
| Example 10 | 25 | 25 | 50 | None | 0.81 |
| Example 11 | 25 | 25 | 50 | None | 0.81 |
| Example 12 | 25 | 25 | 50 | None | 0.81 |
| Example 13 | 25 | 25 | 50 | None | 0.81 |
| Example 14 | 25 | 25 | 50 | 0.5 | 0.96 |
| Example 15 | 25 | 25 | 50 | 0.5 | 0.96 |
| Example 16 | 45 | 45 | 10 | None | 0.89 |
| Example 17 | 0 | 0 | 100 | 1.0 | 0.96 |
| Example 18 | 25 | 25 | 50 | None | 0.81 |
| Example 19 | 25 | 25 | 50 | None | 0.81 |
| Comp. Example 1 | 25 | 25 | 50 | None | 0.81 |
| Comp. Example 2 | 25 | 25 | 50 | None | 0.81 |
| Comp. Example 3 | 50 | 50 | 0 | None | 0.95 |
| Comp. Example 4 | 25 | 25 | 50 | None | 0.81 |

TABLE 3

| | Nonaqueous electrolyte liquid | |
|---|---|---|
| | Adiponitrile (mass %) | 1,3-dioxane (mass %) |
| Example 1 | 1.0 | 1.0 |
| Example 2 | 1.0 | 1.0 |
| Example 3 | 1.0 | 1.0 |
| Example 4 | 1.0 | 1.0 |
| Example 5 | 1.0 | 1.0 |
| Example 6 | 1.0 | 1.0 |
| Example 7 | 1.0 | 1.0 |
| Example 8 | None | 1.0 |
| Example 9 | 1.0 | None |
| Example 10 | 1.0 | 1.0 |
| Example 11 | 1.0 | 1.0 |
| Example 12 | 1.0 | 1.0 |
| Example 13 | 1.0 | 1.0 |
| Example 14 | 1.0 | 1.0 |
| Example 15 | 1.0 | 1.0 |
| Example 16 | 1.0 | 1.0 |
| Example 17 | 1.0 | 1.0 |
| Example 18 | 1.0 | 1.0 |
| Example 19 | 2.0 | 1.0 |
| Comp. Example 1 | 1.0 | 1.0 |
| Comp. Example 2 | 1.0 | 1.0 |
| Comp. Example 3 | 1.0 | 1.0 |
| Comp. Example 4 | 1.0 | 1.0 |

TABLE 4

|  | Initial discharge capacity (%) | Load (%) | Cycle maintenance rate (%) |
|---|---|---|---|
| Example 1 | 170 | 97 | 77 |
| Example 2 | 170 | 97 | 72 |
| Example 3 | 170 | 98 | 72 |
| Example 4 | 170 | 99 | 71 |
| Example 5 | 170 | 95 | 83 |
| Example 6 | 170 | 95 | 82 |
| Example 7 | 170 | 99 | 72 |
| Example 8 | 170 | 98 | 72 |
| Example 9 | 170 | 98 | 72 |
| Example 10 | 185 | 95 | 74 |
| Example 11 | 190 | 96 | 71 |
| Example 12 | 175 | 95 | 73 |
| Example 13 | 180 | 99 | 70 |
| Example 14 | 220 | 97 | 87 |
| Example 15 | 220 | 97 | 87 |
| Example 16 | 110 | 97 | 85 |
| Example 17 | 340 | 97 | 85 |
| Example 18 | 170 | 99 | 65 |
| Example 19 | 170 | 97 | 71 |
| Comp. Example 1 | 170 | 99 | 55 |
| Comp. Example 2 | 170 | 92 | 85 |
| Comp. Example 3 | 100 | 97 | 77 |
| Comp. Example 4 | 170 | 99 | 60 |

EXPLANATION OF THE REFERENCES IN THE DRAWINGS

10: Positive electrode;
11: Positive electrode composition layer;
12: Positive electrode current collector;
13: Tab part;
20: Negative electrode;
21: Negative electrode composition layer;
22: Negative electrode current collector;
23: Tab part;
100: Lithium ion secondary battery;
101: Metal laminated film exterior body;
102: Laminated electrode body;
103: Positive electrode external terminal: and
104: Negative electrode external terminal.

What is claimed is:

1. A lithium ion secondary battery, comprising a positive electrode, a negative electrode, a separator and a nonaqueous electrolyte liquid,
   wherein the positive electrode comprises:
      a first positive electrode material in which a surface of particles of a positive electrode active material is coated with an Al-containing oxide, wherein a coating of the Al-containing oxide has an average coating thickness of 5 to 50 nm,
   wherein the positive electrode active material contained in the positive electrode material comprises a lithium cobalt oxide comprising at least one element selected from the group consisting of Mg, Zr, Ni, Mn, Ti and Al; and
      a second positive electrode material comprising a lithium nickel oxide comprising Co and Al,
   wherein the negative electrode comprises a material S including $SiO_x$ ($0.5 \leq x \leq 1.5$) as a negative electrode active material,
   wherein in 100 mass % of a total of the negative electrode active material included in the negative electrode, the materials S is included in the negative electrode active material at a content from 10 mass % to 100 mass %.

2. The lithium ion secondary battery according to claim 1, wherein at the time when the lithium ion secondary battery is discharged at an discharge current rate of 0.1 C to reach a voltage of 2.0V, a molar ratio (Li/M) of Li and a metal M except for Li is 0.9 to 1.05, wherein said Li and said metal M are contained in the positive electrode material and the positive electrode active material in the positive electrode.

3. The lithium ion secondary battery according to claim 1, wherein the positive electrode material has a specific surface area of 0.1 to 0.4 m²/g.

4. The lithium ion secondary battery according to claim 1, wherein the negative electrode comprises a negative electrode composition layer including the negative electrode active material, the negative electrode composition layer being formed on one surface or both surfaces of a current collector, wherein the current collector is made of a current collection foil having a through hole penetrating from one surface thereof to the other surface thereof.

5. The lithium ion secondary battery according to claim 1, wherein the nonaqueous electrolyte liquid includes a nitrile additive at a content from 0.1 mass % to 7 mass %.

6. The lithium ion secondary battery according to claim 1, wherein the nonaqueous electrolyte liquid includes 1,3-dioxane at a content from 0.1 mass % to 5 mass %.

* * * * *